United States Patent
Zheng et al.

(10) Patent No.: US 9,328,238 B2
(45) Date of Patent: May 3, 2016

(54) WEAR RESISTANT COMPOSITIONS WITH LOW PARTICULATE CONTAMINATION AND METHOD OF MAKING THOSE COMPOSITIONS

(71) Applicant: SABIC Global Technologies B.V., Bergen op Zoom (NL)

(72) Inventors: Yun Zheng, Shanghai (CN); Xiangbing Peng, Shanghai (CN); Shijie Song, Shanghai (CN); Jiwen Wang, Shanghai (CN)

(73) Assignee: SABIC Global Technologies B.V., Bergen op Zoom (NL)

(*) Notice: Subject to any disclaimer, the term of this patent is extended or adjusted under 35 U.S.C. 154(b) by 0 days.

(21) Appl. No.: 14/303,294

(22) Filed: Jun. 12, 2014

(65) Prior Publication Data

US 2014/0371378 A1    Dec. 18, 2014

Related U.S. Application Data

(60) Provisional application No. 61/834,321, filed on Jun. 12, 2013.

(51) Int. Cl.
| | |
|---|---|
| *C08L 67/02* | (2006.01) |
| *C08L 69/00* | (2006.01) |
| *C08L 101/00* | (2006.01) |
| *C08G 73/10* | (2006.01) |
| *C08L 77/02* | (2006.01) |
| *C08L 77/06* | (2006.01) |
| *C08L 79/08* | (2006.01) |

(52) U.S. Cl.
CPC ............. *C08L 67/02* (2013.01); *C08G 73/1046* (2013.01); *C08L 69/00* (2013.01); *C08L 77/02* (2013.01); *C08L 77/06* (2013.01); *C08L 79/08* (2013.01); *C08L 101/00* (2013.01); *C08L 2203/20* (2013.01); *C08L 2205/03* (2013.01)

(58) Field of Classification Search
CPC .. C08L 67/02; C08L 2203/20; C08L 2205/03
See application file for complete search history.

(56) References Cited

U.S. PATENT DOCUMENTS

| | | | |
|---|---|---|---|
| 3,875,116 | A | 4/1975 | Heath et al. |
| 4,548,997 | A | 10/1985 | Mellinger et al. |
| 4,629,759 | A | 12/1986 | Rock |
| 4,690,997 | A | 9/1987 | Cella et al. |
| 4,808,686 | A | 2/1989 | Cella et al. |
| 4,816,527 | A | 3/1989 | Rock |
| 5,928,589 | A | 7/1999 | Norota et al. |
| 6,310,145 | B1 | 10/2001 | Puyenbroek et al. |
| 6,355,723 | B1 | 3/2002 | Van Baal et al. |
| 6,919,422 | B2 | 7/2005 | Gallucci et al. |
| 7,041,773 | B2 | 5/2006 | Gallucci et al. |
| 7,230,066 | B2 | 6/2007 | Khouri et al. |
| 7,786,246 | B2 | 8/2010 | Jansen et al. |

FOREIGN PATENT DOCUMENTS

| | | | | |
|---|---|---|---|---|
| GB | 1 593 102 | | 7/1981 | |
| JP | S59-164358 | | 9/1984 | |
| JP | H01-247458 | | 10/1989 | |
| JP | H01-259059 | | 10/1989 | |
| JP | 8-199051 | * | 8/1996 | ............... C08L 67/02 |
| JP | 2000-281884 | | 10/2000 | |
| JP | 2000-290497 | | 10/2000 | |
| JP | 2002-302597 | | 10/2002 | |
| WO | WO 98/07779 | * | 2/1998 | ............... C08K 3/22 |

OTHER PUBLICATIONS

International Patent Application No. PCT/IB2014/062144: International Search Report and Written Opinion dated Dec. 8, 2014, 10 pages.

* cited by examiner

*Primary Examiner* — Robert Harlan
(74) *Attorney, Agent, or Firm* — Baker Hostetler LLP

(57) ABSTRACT

The present disclosure relates to a wear resistant polymer composition. The disclosed composition comprises a polymer matrix and a tetrafluoroethylene polymer. Also disclosed is a method for making the disclosed polymer composition and an article of manufacture comprising the disclosed polymer composition.

25 Claims, No Drawings

WEAR RESISTANT COMPOSITIONS WITH LOW PARTICULATE CONTAMINATION AND METHOD OF MAKING THOSE COMPOSITIONS

CROSS REFERENCE TO RELATED APPLICATIONS

This application claims benefit of U.S. Patent Application No. 61/834,321 filed Jun. 12, 2013, the disclosure of which is incorporated herein in its entirety.

BACKGROUND

A challenging request from the mobile equipment market is an ever larger storage capability on phones, music players and handheld PCs with more and more reduced weight, size, power consumption and cost. In order to face this growing demand, new technologies have to be adopted in magnetic storage manufacturing along with a deeper integration of the electronic subsystems. For example, hard disk drives (HDD) are widely used as auxiliary memory devices in computer systems to magnetically record data. The development of new technologies in recent years allowed a continuous miniaturization of the HDD from an initial size of 3.5 inches to 2.5 inches, to 1.8 inches, and to a current size of 0.85 inches, while continuously improving HDD's storage capabilities.

The general miniaturization of HDD requires a size reduction of the hard disk placement, and as a result there is a strong demand for the HDD inner parts to be formed from a resin having reduced organic, ionic, and particulate contaminations. In addition, a high wear resistance is also required to insure long time stability of inner parts having repeating motions in contact with other metal or plastic components of HDDs, such as various latches, ramps, brackets, and the like.

Previous attempts to include internal lubricants, such as polytetrafluoroethylene (PTFE), graphite, molybdenum disulfide, polysiloxane, aramid fiber, various oils, and reinforcing fibers, into the polymeric components in order to improve a wear resistance and a fractional loss resulted in undesirable increase in organic, ionic and particulate contaminations of the final product.

Accordingly, it would be beneficial to provide improved wear resistant polymer compositions having a low particulate contamination. This and other needs are satisfied by the various aspects of the present disclosure.

SUMMARY

In accordance with the purpose(s) of the disclosure, as embodied and broadly described herein, this disclosure, in one aspect, relates to a polymer composition comprising a thermoplastic polymer matrix, a particulate polytetrafluoroethylene polymer additive dispersed within the thermoplastic polymer matrix, wherein the particulate polytetrafluoroethylene additive has an average particle size less than 40 µm, and wherein at least 90 weight % of the particulate polytetrafluoroethylene additive particles are smaller than 60 µm, and a reinforcement filler dispersed within the thermoplastic polymer matrix, and wherein the polymer composition can be useful in HDD devices, computer devices, household appliances, electromagnetic interference devices, Wi-Fi devices, Bluetooth devices, GPS devices, and the like applications. Also disclosed are methods of making said compositions; and articles of manufacture comprising the disclosed compositions.

In one aspect, disclosed herein, a polymer composition comprising: a) from about 55 weight % to about 95 weight % of a thermoplastic polymer matrix; and b) from about 5 weight % to about 20 weight % of a particulate polytetrafluoroethylene polymer additive dispersed within the thermoplastic polymer matrix, wherein the particulate polytetrafluoroethylene additive has an average particle size less than 40 µm, and wherein at least 90 weight % of the particulate polytetrafluoroethylene additive particles are smaller than 60 µm; and c) from greater than 0 weight % to about 40 weight % of a reinforcement filler dispersed within the thermoplastic polymer matrix.

Also disclosed herein is a method of making a polymer composition comprising a) combining: i) from about 55% by weight to about 95% by weight of a thermoplastic polymer matrix; and ii) from about 5% by weight to about 20% by weight of a particulate polytetrafluoroethylene additive dispersed within the thermopplastic polymer matrix, wherein the particulate polytetrafluoroethyle additive has an average particle size less than 40 µm, and wherein at least 90 weight % of the particulate polytetrafluoroethylene additive particles are smaller than 60 µm; and iii) from greater than 0 weight % to about 40 weight % of a reinforcement filler dispersed within the thermoplastic polymer matrix.

Also disclosed herein is an article comprising the described compositions.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Other advantages will be set forth in part in the description which follows or may be learned by practice. The advantages will be realized and attained by means of the elements and combinations particularly pointed in the appended claims. It is to be understood that both the foregoing general description and the following detailed description are exemplary and explanatory only and are not restrictive, as claimed.

DETAILED DESCRIPTION

The present disclosure can be understood more readily by reference to the following detailed description, examples, drawings, and claims, and their previous and following description. However, before the present compositions, articles, devices, systems, and/or methods are disclosed and described, it is to be understood that this disclosure is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the disclosure is also provided as an enabling teaching of the disclosure in its best, currently known aspect. To this end, those of ordinary skill in the relevant art will recognize and appreciate that changes and modifications can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those of ordinary skill in the relevant art will recognize that many modifications and adaptations to the present disclosure are possible and can even be desirable in certain circumstances and are thus also a part of the present disclosure. Thus, the following description is provided as illustrative of the principles of the present disclosure and not in limitation thereof.

Various combinations of elements of this disclosure are encompassed by this disclosure, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

DEFINITIONS

It is to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of two or more such fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance may or may not occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Disclosed are component materials to be used to prepare disclosed compositions of the disclosure as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C—F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8 weight %, it is understood that this percentage is relation to a total compositional percentage of 100%.

Compounds disclosed herein are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulfur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula $AOA^1$, where A and $A^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —S(O)$_2$R, —OS(O)$_2$R, or, —OS(O)$_2$OR, where R can be hydrogen, an alkyl, alkenyl, alkynyl, aryl, aralkyl, cycloalkyl, halogenated alkyl, or heterocycloalkyl group described above.

As used herein, the terms "number average molecular weight" or "Mn" can be used interchangeably, and refer to the statistical average molecular weight of all the polymer chains in the sample and is defined by the formula:

$$Mn = \frac{\sum N_i M_i}{\sum N_i},$$

where $M_i$ is the molecular weight of a chain and $N_i$ is the number of chains of that molecular weight. Mn can be determined for polymers, such as polycarbonate polymers or polycarbonate-PMMA copolymers, by methods well known to a person having ordinary skill in the art. It is to be understood that as used herein, Mn is measured gel permeation chromatography and as calibrated with polycarbonate standards. For example, gel permeation chromatography can be carried out using a crosslinked styrene-divinyl benzene column, at a sample concentration of 1 milligram per milliliter with appropriate mobile phase solvents.

As used herein, the terms "weight average molecular weight" or "Mw" can be used interchangeably, and are defined by the formula:

$$Mw = \frac{\sum N_i M_i^2}{\sum N_i M_i},$$

where $M_i$ is the molecular weight of a chain and $N_i$ is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured gel permeation chromatography. In some cases, Mw is measured gel permeation chromatography and calibrated with polycarbonate standards. Gel permeation chromatography can be carried out using a crosslinked styrene-divinyl benzene column, at a sample concentration of about 1 milligram per milliliter with appropriate mobile phase solvents.

As used herein, the terms "polydispersity index" or "PDI" can be used interchangeably, and are defined by the formula:

$$PDI = \frac{Mw}{Mn}.$$

The PDI has a value equal to or greater than 1, but as the polymer chains approach uniform chain length, the PDI approaches unity.

As used herein, the terms "mean" or "statistical mean", can be used interchangeably, and are defined by the formula:

$$\bar{x} = \frac{1}{n} \cdot \sum_{i=1}^{n} x_i$$

wherein $x_i$ is the measured value, and n is the number of values.

As used herein, the term "variance" refers to a numerical value that is used to indicate how widely the measured values in a group vary, and is defined by the formula:

$$\sigma^2 = \frac{\Sigma(x_i - \bar{x})^2}{n},$$

wherein $\sigma^2$ is a variance, $x_i$ is the measured value, $\bar{x}$ is the mean value, and n is the number of values.

The terms "polyamide" or "polyamides" as used herein refer to any one of a class of synthetic polymeric materials containing a recurring —CONH— group.

The terms "polyetherimide" or "PEI" are used interchangeably and refer to a combination polymer that has both polyimide and polyether units in the backbone. A commercial example of PEI is ULTEM® that is sold by SABIC Innovative Plastics.

The term "wear resistance" as used herein refers to the ability of the polymer composition to resist the gradual wearing away caused by abrasion and friction.

The terms "residues" and "structural units", used in reference to the constituents of the polymers, are synonymous throughout the specification.

Each of the component materials disclosed herein are either commercially available and/or the methods for the production thereof are known to those of ordinary skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

I. Polymer Composition

As summarized above, the disclosure provides a wear resistant polymer composition having a low particulate contamination and a high lubricating performance. For example, as described in greater detail below, aspects of the disclosure provide a wear resistant polymer composition that can be useful in HDD devices, computer devices, household appliances, electromagnetic interference devices, Wi-Fi devices, Bluetooth devices, GPS devices, and the like applications. To that end, the disclosed wear resistant polymer composition is a polymer composition comprising a) from about 55 weight % to about 95 weight % of a thermoplastic polymer matrix; b) from about 5 weight % to about 20 weight % of a particulate polytetrafluoroethylene additive dispersed within the thermoplastic polymer matrix, wherein the particulate polytetrafluoroethylene additive has an average particle size less than 40 µm, and wherein at least 90 weight % of the particulate polytetrafluoroethylene additive particles are smaller than 60 µm; and c) from greater than 0 weight % to about 40 weight % of a reinforcement filler dispersed within the thermoplastic polymer matrix.

In one aspect, the disclosed thermoplastic polymer matrix can comprise at least one polymer selected from the group consisting of a polycarbonate (PC), a PC copolymer, a polyamide (PA), a PEI, a polybutylene terephthalate (PBT), and a polyethylene terephthalate (PET).

In one aspect, the thermoplastic polymer matrix can be present in the polymer composition in a range from about 55 weight % to about 95 weight %, including exemplary values of about 60 weight %, 65 weight %, 70 weight %, 75 weight %, 80 weight %, 85 weight %, and 90 weight %, relative to the total weight of the polymer composition. In still further aspects, the thermoplastic polymer matrix can be present in any range derived from any two values set forth above. For example, the thermoplastic polymer matrix can be present from about 55 weight % to about 80 weight %, from about 60 weight % to about 80 weight %, or from about 60 weight % to about 75 weight % relative to the total weight of the polymer composition.

In one aspect, the thermoplastic polymer matrix comprises a PC. In one aspect, it should be understood that the PC polymer that is present within the thermoplastic polymer matrix can be present in any desired amount relative to the total amount of the thermoplastic polymer matrix. For example, the PC polymer can be present in an amount in the range of from greater than 0 weight % to about 100 weight % relative to the total weight of the thermoplastic polymer matrix in the polymer composition, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight 85 weight %, 90 weight %, and 95 weight % relative to the total weight of the thermoplastic polymer matrix in the polymer composition. In one aspect, the PC polymer can be present in exemplarily amount of 16 weight %, 17 weight %, 18 weight %, 19 weight %, 20 weight %, 21 weight %, and 22 weight %. In yet another aspect, the PC polymer can be present in exemplarily amount of 51 weight %, 52 weight %, 53 weight %, 54 weight %, 55 weight %, 56 weight %, 57 weight %, 58 weight %, 59 weight %, 60 weight %, 61 weight %, and 62 weight %. In still further aspects, the PC polymer can be present in the thermoplastic polymer matrix in any range derived from any two values set forth above. For example, the PC polymer can be present from about 10 weight % to about 80 weight %, from about 20 weight % to about 60 weight %, or from about 50 weight % to about 75 weight % relative to the total weight of the thermoplastic polymer matrix in the polymer composition.

In another aspect, the thermoplastic polymer matrix comprises a polyester PC copolymer. In one aspect, it should be understood that the polyester PC copolymer that is present within the thermoplastic polymer matrix can be present in any desired amount relative to the total amount of the thermoplastic polymer matrix. For example, the polyester PC copolymer can be present in an amount in the range of from greater than 0 weight % to about 100 weight % relative to the total weight of the thermoplastic polymer matrix in the polymer composition, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, 85 weight %, 90 weight %, and 95 weight % relative to the total weight of the thermoplastic polymer matrix in the polymer composition. In one aspect, the polyester PC copolymer can be present in exemplarily amount of 16 weight %, 17 weight %, 18 weight %, 19 weight %, 20 weight %, 21 weight %, and 22 weight %. In yet another aspect, the polyester PC copolymer can be present in exemplarily amount of 51 weight %, 52 weight %, 53 weight %, 54 weight %, 55 weight %, 56 weight %, 57 weight %, 58 weight %, 59 weight %, 60 weight %, 61 weight %, and 62 weight %. In still further aspects, the polyester PC copolymer can be present in the thermoplastic polymer matrix in any range derived from any two values set forth above. For example, the polyester PC copolymer can be present from about 10 weight % to about 80 weight %, from about 20 weight % to about 60 weight %, or from about 50 weight % to about 75 weight % relative to the total weight of the thermoplastic polymer matrix in the polymer composition.

In a yet further aspect, the thermoplastic polymer matrix comprises a PA. In one aspect, it should be understood that the PA that is present within the thermoplastic polymer matrix can be present in any desired amount relative to the total amount of the thermoplastic polymer matrix. For example, the PA can be present in an amount in the range of from greater than 0 weight % to about 100 weight % relative to the total weight of the thermoplastic polymer matrix in the polymer composition, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, 85 weight %, 90 weight %, and 95 weight % relative to the total weight of the thermoplastic polymer matrix in the polymer composition. In still further aspects, the PA can be present in the thermoplastic polymer matrix in any range derived from any two values set forth above. For example, the PA can be present from about 10 weight % to about 80 weight %, from about 20 weight % to about 60 weight %, or from about 50 weight % to about 75 weight % relative to the total weight of the thermoplastic polymer matrix in the polymer composition.

In one aspect, the thermoplastic polymer matrix comprises a PEI. In one aspect, it should be understood that the PEI that is present within the thermoplastic polymer matrix can be present in any desired amount relative to the total amount of the thermoplastic polymer matrix. For example, the PEI can be present in an amount in the range of from greater than 0 weight % to about 100 weight % relative to the total weight of the thermoplastic polymer matrix in the polymer composition, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, 85 weight %, 90 weight %, and 95 weight % relative to the total weight of the thermoplastic polymer matrix in the polymer composition. In still further aspects, the PEI can be present in the thermoplastic polymer matrix in any range derived from any two values set forth above. For example, the PEI can be present from about 10 weight % to about 80 weight %, from about 20 weight % to about 60 weight %, or from about 50 weight % to about 75 weight % relative to the total weight of the thermoplastic polymer matrix in the polymer composition.

In another aspect, the thermoplastic polymer matrix comprises a PBT. In one aspect, it should be understood that the PBT that is present within the thermoplastic polymer matrix can be present in any desired amount relative to the total amount of the thermoplastic polymer matrix. For example, the PBT can be present in an amount in the range of from greater than 0 weight % to about 100 weight % relative to the total weight of the thermoplastic polymer matrix in the polymer composition, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, 85 weight %, 90 weight %, and 95 weight % relative to the total weight of the thermoplastic polymer matrix in the polymer composition. In still further aspects, the PBT can be present in the thermoplastic polymer matrix in any range derived from any two values set forth above. For example, the PBT can be present from about 10 weight % to about 80 weight %, from about 20 weight % to about 60 weight %, or from about 50 weight % to about 75 weight % relative to the total weight of the thermoplastic polymer matrix in the polymer composition.

In another aspect, the thermoplastic polymer matrix comprises a PET. In one aspect, it should be understood that the polyethylene terephthalate that is present within the thermoplastic polymer matrix can be present in any desired amount relative to the total amount of the thermoplastic polymer matrix. For example, the polyethylene terephthalate can be present in an amount in the range of from greater than 0 weight % to about 100 weight % relative to the total weight of the thermoplastic polymer matrix in the polymer composition, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, 85 weight %, 90 weight %, and 95 weight % relative to the total weight of the thermoplastic polymer matrix in the polymer composition. In still further aspects, the polyethylene terephthalate can be present in the thermoplastic polymer matrix in any range derived from any two values set forth above. For example, the polyethylene terephthalate can be present from about 10 weight % to about 80 weight %, from about 20 weight % to about 60 weight %, or from about 50 weight % to about 75 weight % relative to the total weight of the thermoplastic polymer matrix in the polymer composition.

In aspects where the thermoplastic polymer matrix comprises a blend of two or more polymers selected from the group consisting of a PC, a PC copolymer, a PA, a PEI, a PBT, and a PET, it should be understood that each selected polymer that is present within the thermoplastic polymer matrix can be present in any desired amount relative to the total amount of the thermoplastic polymer matrix. For example, in an aspect wherein the thermoplastic polymer matrix comprises a blend of PC polymer and a polyester PC copolymer, the PC polymer can be present in an amount in the range of from greater than 0 weight % to less than 100 weight % relative to the total weight of the thermoplastic polymer matrix in the polymer composition, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, 85 weight %, 90 weight %, and 95 weight % relative to the total weight of the thermoplastic polymer matrix in the polymer composition. In still further aspects, the PC polymer can be present in the thermoplastic polymer matrix in any range derived from any two values set forth above. For example, the PC polymer can be present from about 10 weight % to about 80 weight %, from about 20 weight % to about 60 weight %, or from about 50 weight % to about 75 weight % relative to the total weight of the thermoplastic polymer matrix in the polymer composition.

Similarly, the polyester PC copolymer can also be present in an amount in the range of from greater than 0 weight % to less than 100 weight % relative to the total weight of the thermoplastic polymer matrix, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, 85 weight %, 90 weight %, and 95 weight % relative to the total weight of the thermoplastic polymer matrix in the polymer composition. In still further aspects, the polyester PC copolymer can be present in the thermoplastic polymer matrix in any range derived from any two values set forth above. For example, the polyester PC copolymer can be present from about 10 weight % to about 80 weight %, from about 20 weight % to about 60 weight %, or from about 50 weight % to about 75 weight % relative to the total weight of the thermoplastic polymer matrix in the polymer composition.

In yet another aspect, the polymer composition can further comprise from about 5 weight % to about 20 weight % of a particulate polytetrafluoroethylene additive dispersed within the thermoplastic polymer matrix, wherein the particulate polytetrafluoroethylene additive has an average particle size less than 50 µm. In one aspect, the pariculate polytetrafluoroethylene additive can be present in exemplarily amounts of about 8 weight %, 10 weight %, 12 weight %, 14 weight %, 16 weight %, and 18 weight % relative to the total weight of the polymer composition. In still further aspects, the polymer composition can comprise the particulate polytetrafluoroethylene additive dispersed within the thermoplastic polymer matrix in any range derived from any two values set forth above. For example, the particulate polytetrafluoroethylene additive dispersed within the thermoplastic polymer matrix can be present from about 8 weight % to about 20 weight %, from about 10 weight % to about 20 weight %, or from about 15 weight % to about 20 weight % relative to the total weight of the polymer composition.

In one aspect, the polymer composition can further comprise a reinforcement filler dispersed within the thermoplastic polymer matrix in the amount greater from 0 weight % to about 40% weight %, including exemplary values of 5 weight %, 10 weight %, 15 weight %, 20 weight %, 25 weight %, 30 weight %, and 35 weight % relative to the total weight of the polymer composition. In still further aspects, the composition can comprise the reinforcment filler dispersed within the thermoplastic polymer matrix in any range derived from any two values set forth above. For example, the reinforcment filler dispersed within the thermoplastic polymer matrix can be present from about 5 weight % to about 25% weight %, from about 10 weight % to about 30 weight %, or from about 15 weight % to about 20 weight % relative to the total weight of the polymer composition.

In one aspect, the polymer composition can comprise from about 5 weight % to about 20 weight % of the reinforcment filler dispersed within the thermoplastic polymer matrix; about 5 weight % to about 20 weight % of the particulate polytetrafluoroethylene additive dispersed within the thermoplastic polymer matrix, wherein the particulate polytetrafluoroethylene additive has an average particle size less than 50 µm; and about 55 weight % to about 80 weight % of the PC, or polyester PC copolymer, or a combination thereof. In another aspect, the polymer composition can comprise from about 5 weight % to about 30 weight % of the reinforcment filler dispersed within the thermoplastic polymer matrix; about 5 weight % to about 15 weight % of the particulate polytetrafluoroethylene additive dispersed within the thermoplastic polymer matrix, wherein the particulate polytetrafluoroethylene additive has an average particle size less than 50 µm; and about 55 weight % to about 75 weight % of the PC, or polyester PC copolymer, or a combination thereof.

The polymer composition disclosed herein provides a robust wear resistant performance or lubricating performance while maintaining good mechanical properties. The wear resistance or lubricating performance can be characterized by a wear (K) factor. The wear (K) factor can be measured using a Thrust Washer Wear test and ASTM D3702-78 test at various pressure (psi) and speed (fpm) conditions, for example, 40 psi and 50 fpm. In one aspect, the polymer composition disclosed herein exhibits a wear factor of less than 3500 as determined by a test according to ASTM D3702 at 40 psi and 50 fpm. In another aspect, the polymer composition disclosed herein exhibits a wear factor of less than 2500 as determined by a test according to ASTM D3702 at 40 psi and 50 fpm. In yet another aspect, the polymer composition disclosed herein exhibits a wear factor of less than 1000 as determined by a test according to ASTM D3702 at 40 psi and 50 fpm. In a further aspect, the polymer composition disclosed herein exhibits a wear factor of less than 750 as determined by a test according to ASTM D3702 at 40 psi and 50 fpm. In a yet further aspect, the polymer composition disclosed herein exhibits a wear factor of less than 500 as determined by a test according to ASTM D3702 at 40 psi and 50 fpm. In yet another aspect, the polymer composition disclosed herein exhibits a wear factor of less than 300 as determined by a test according to ASTM D3702 at 40 psi and 50 fpm. In still another aspect, the polymer composition disclosed herein exhibits a wear factor of less than 200 as determined by a test according to ASTM D3702 at 40 psi and 50 fpm. In a further aspect, the polymer composition disclosed herein exhibits a wear factor of less than 150 as determined by a test according to ASTM D3702 at 40 psi and 50 fpm. In a still further aspect, the polymer composition disclosed herein exhibits a wear factor of less than 120 as determined by a test according to ASTM D3702 at 40 psi and 50 fpm.

In one aspect, the polymer composition disclosed herein exhibits a low particulate contamination. It is desirable that the particulate contamination as characterized by liquid particle counts (LPC) is kept low. In one aspect, the polymer composition disclosed herein exhibits a low particulate contamination with liquid particle counts (LPC) of less than $1 \times 10^5$. In one aspect, the polymer composition disclosed herein exhibits a low particulate contamination with liquid particle counts (LPC) of less than $6 \times 10^4$. In one aspect, the polymer composition disclosed herein exhibits a low particulate contamination with liquid particle counts (LPC) of less than $3 \times 10^4$. In another aspect, the polymer composition disclosed herein exhibits a low particulate contamination with liquid particle counts (LPC) of less than $1 \times 10^4$. In another aspect, the polymer composition disclosed herein exhibits a low particulate contamination with liquid particle counts (LPC) of less than $5 \times 10^3$.

1. Thermoplastic Polymer Matrix

In one aspect, the thermoplastic polymer matrix can be present in the polymer composition in a range from about 55 weight % to about 95 weight %, including exemplary values of about 60 weight %, 65 weight %, 70 weight %, 75 weight %, 80 weight %, 85 weight %, and 90 weight % relative to the total weight of the polymer composition. In still further aspects, the thermoplastic polymer matrix can be present in any range derived from any two values set forth above. For example, the thermoplastic polymer matrix can be present from about 55 weight % to about 80 weight %, from about 60 weight % to about 80 weight %, or from about 60 weight % to about 75 weight % relative to the total weight of the polymer composition.

In another aspect, the disclosed thermoplastic polymer matrix can comprise at least one polymer selected from the group consisting of a PC, a PC copolymer, a PA, a PEI, a PBT, and a PET.

A. Polycarbonate and Polycarbonate Copolymer

The term PC as used herein is not intended to refer to only a specific PC or group of PCs, but rather refers to the any one of the class of compounds containing a repeating chain of carbonate groups. In one aspect, a PC can include any one or more of those PCs disclosed and described in U.S. Pat. No. 7,786,246, which is hereby incorporated by reference in its entirety for the specific purpose of disclosing various PC compositions and methods for manufacture of same.

In one aspect, a PC polymer as disclosed herein can be an aliphatic-diol based PC. In another aspect, the PC polymer can comprise a carbonate unit derived from a dihydroxy compound, such as, for example, a bisphenol that differs from the aliphatic diol. In still further aspects, an exemplary PC polymer includes aromatic PCs conventionally manufactured through a transesterification reaction of one or more aromatic dihydroxy compound(s) and a carbonic acid diester in the presence of one or more catalyst(s).

In one aspect, non-limiting examples of suitable bisphenol compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxy-3 methylphenyl)cyclohexane 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one dihydroxy aromatic compound can also be used. In another aspect, other types of diols can be present in the PC.

In a yet another aspect, PCs with branching groups can be useful, provided that such branching does not significantly adversely affect desired properties of the PC. Branched PC blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethylbenzyl) phenol), 4-chloroformyl phthalic anhydride, trimesic acid, and benzophenone tetracarboxylic acid. In one aspect, a branching agent can be added at a level of about 0.05 to about 2.0 wt %. In a still another aspect, mixtures comprising linear PCs and branched PCs can be used.

The PC polymer can comprise copolymers comprising carbonate units and other types of polymer units, including ester units, and combinations comprising at least one of homopolycarbonates and copolycarbonates. An exemplary PC copolymer of this type is a polyester carbonate, also known as a polyester-PC. Such copolymers further contain carbonate units derived from oligomeric ester-containing dihydroxy compounds (also referred to herein as hydroxy end-capped oligomeric acrylate esters). In another aspect, the first PC component does not comprise a separate polymer such as a polyester. In one aspect, an aliphatic-based PC comprises aliphatic units that are either aliphatic carbonate units derived from aliphatic diols, or a combination of aliphatic ester units derived from aliphatic diacids having greater than 13 carbons.

The molar ratio of ester units to carbonate units in the copolymers can vary broadly, for example 1:99 to 99:1, specifically 10:90 to 90:10, more specifically 25:75 to 75:25, depending on the desired properties of the final composition.

In an aspect, the thermoplastic polymer matrix comprises a polyester-PC copolymer, and specifically a polyester-PC copolymer in which the ester units of formula (1) comprise soft block ester units, also referred to herein as aliphatic dicarboxylic acid ester units. Such a polyester-PC copolymer comprising soft block ester units is also referred to herein as a poly(aliphatic ester)-polycarbonate.

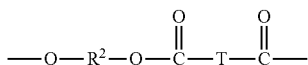
(1)

wherein $R^2$ is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T is a divalent group derived from a dicarboxylic acid (aliphatic, aromatic, or alkyl aromatic), and can be, for example, a $C_{4-18}$ aliphatic group, a $C_{6-20}$ alkylene group, a $C_{6-20}$ alkylene group, a $C_{6-20}$ alicyclic group, a $C_{6-20}$ alkyl aromatic group, or a $C_{6-20}$ aromatic group.

$R^2$ can be is a $C_{2-10}$ alkylene group having a straight chain, branched chain, or cyclic (including polycyclic) structure. Alternatively, $R^2$ can be derived from an aromatic dihydroxy compound of formula (2), or from an aromatic dihydroxy compound of formula (3).

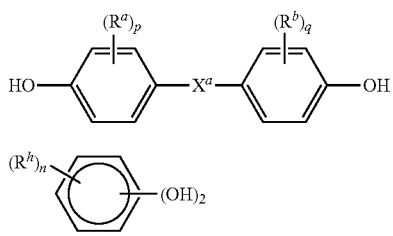
(2)

(3)

The soft block ester unit can be a $C_{6-20}$ aliphatic dicarboxylic acid ester unit (where $C_{6-20}$ includes the terminal carboxyl groups), and can be straight chain (i.e., unbranched) or branched chain dicarboxylic acids, cycloalkyl or cycloalkylidene-containing dicarboxylic acids units, or combinations of these structural units. In an aspect, the $C_{6-20}$ aliphatic dicarboxylic acid ester unit includes a straight chain alkylene group comprising methylene (—$CH_2$—) repeating units. In a specific aspect, a useful soft block ester unit comprises units of formula (1a):

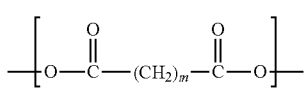
(1a)

where m is 4 to 18. In a specific aspect of formula (1a), m is 8 to 10. The poly(aliphatic ester)-polycarbonate can include less than or equal to 25 wt % of the soft block unit. In an aspect, a poly(aliphatic ester)-polycarbonate comprises units of formula (1a) in an amount of 0.5 to 10 wt %, specifically 1 to 9 wt %, and more specifically 3 to 8 wt %, based on the total weight of the poly(aliphatic ester)-polycarbonate.

The poly(aliphatic ester)-polycarbonate is a copolymer of soft block ester units and carbonate units. The poly(aliphatic ester)-polycarbonate is shown in formula (1b):

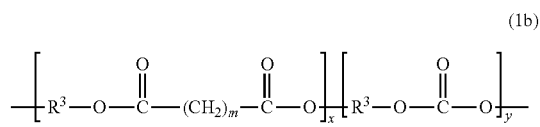
(1b)

where each $R^2$ is independently derived from a dihydroxyaromatic compound of formula (2) or (3), m is 4 to 18, and x and y each represent average weight percentages of the poly(aliphatic ester)-polycarbonate where the average weight percentage ratio x:y is 10:90 to 0.5:99.5, specifically 9:91 to 1:99, and more specifically 8:92 to 3:97, where x+y is 100.

Soft block ester units, as defined herein, can be derived from an alpha, omega $C_{6-20}$ aliphatic dicarboxylic acid or a reactive derivative thereof. In a specific aspect, the soft block ester units can be derived from an alpha, omega $C_{10-12}$ aliphatic dicarboxylic acid or a reactive derivative thereof. In another specific aspect, the carboxylate portion of the aliphatic ester unit of formula (1a), in which the terminal carboxylate groups are connected by a chain of repeating methylene (—$CH_2$—) units (where m is as defined for formula (1a)), is derived from the corresponding dicarboxylic acid or reactive derivative thereof, such as the acid halide (specifically, the acid chloride), an ester, or the like. Exemplary alpha, omega dicarboxylic acids (from which the corresponding acid chlorides can be derived) include alpha, omega $C_6$ dicarboxylic acids such as hexanedioic acid (also referred to as adipic acid); alpha, omega $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_{6-20}$ limitation can be used. A specific aspect of the poly(aliphatic ester)-polycarbonate having soft block ester units comprising a straight chain methylene group and a bisphenol A PC group is shown in formula (1c):

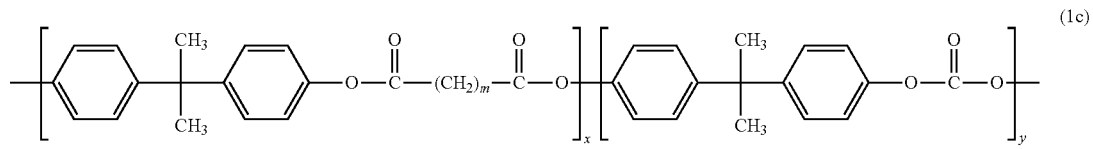
(1c)

where m is 4 to 18 and x and y are as defined for formula (1b). In a specific exemplary aspect, a useful poly(aliphatic ester)- polycarbonate copolymer comprises sebacic acid ester units and bisphenol A carbonate units (formula (1c), where m is 8, and the average weight ratio of x:y is 6:94).

Desirably, the poly(aliphatic ester)-polycarbonate has a glass transition temperature (Tg) of 110 to 145° C., specifically 115 to 145° C., more specifically 120 to 145° C., more specifically 128 to 139° C., and still more specifically 130 to 139° C.

In one aspect, the molecular weight of any particular PC can be determined by, for example, gel permeation chromatography using universal calibration methods based on polystyrene (PS) standards. Generally PCs can have a weight average molecular weight (Mw), of greater than about 5,000 g/mol based on PS standards. In one aspect, the PCs can have an Mw of greater than or equal to about 20,000 g/mol, based on PS standards. In another aspect, the PCs have an Mw based on PS standards of about 20,000 to 100,000 g/mol, including for example 30,000 g/mol, 40,000 g/mol, 50,000 g/mol, 60,000 g/mol, 70,000 g/mol, 80,000 g/mol, or 90,000 g/mol. In still further aspects, the PCs have an Mw based on PS standards of about 22,000 to about 50,000 g/mol. In still further aspects, the PCs have an Mw based on PS standards of about 25,000 to 40,000 g/mol.

Molecular weight (Mw and Mn) as described herein, and polydispersity as calculated therefrom, can be determined using gel permeation chromatography (GPC), using a crosslinked styrene-divinylbenzene column, and either PS or PC standards as specified. GPC samples can be prepared in a solvent such as methylene chloride or chloroform at a concentration of about 1 mg/ml, and can be eluted at a flow rate of about 0.2 to 1.0 ml/min. In one aspect, the glass transition temperature (Tg) of a PC can be less than or equal to about 160° C., less than or equal to about 150° C., less than or equal to about 145° C., less than or equal to about 140° C., or less than or equal to about 135° C. In a further aspect, the glass transition temperature of a PC can be from about 85° C. to about 160° C., from about 90° C. to about 160° C., from about 90° C. to about 150° C., or from about 90° C. to about 145° C. In a still further aspect, the glass transition temperature of a PC can be from about 85° C. to about 130° C., from about 90° C. to about 130° C., from about 90° C. to about 125° C., or from about 90° C. to about 120° C.

PCs, including polyester-polycarbonates, can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

The melt polymerization can include a transesterification catalyst comprising a first catalyst, also referred to herein as an alpha catalyst, comprising a metal cation and an anion. In one aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O_2^-$), thiolate ($HS^-$), sulfide ($S_2^-$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediamine tetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprises sodium hydroxide, potassium hydroxide, sodium carbonate, potassium carbonate, sodium methoxide, potassium methoxide, $NaH_2PO_4$, or a combination comprising at least one of the foregoing.

Carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary aspect, an interfacial polymerization reaction to form carbonate linkages uses phosgene as a carbonate precursor, and is referred to as a phosgenation reaction.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization. In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate.

Among the phase transfer catalysts that can be used are catalysts of the formula $(R^3)_4Q^+X$ wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, [CH$_3$(CH$_2$)$_3$]$_4$NX, [CH$_3$(CH$_2$)$_3$]$_4$PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, and CH$_3$[CH$_3$(CH$_2$)$_2$]$_3$NX, wherein X is Cl$^-$, Br$^-$, a C$_{6-18}$ alkoxy group or a C$_{6-18}$ aryloxy group. An effective amount of a phase transfer catalyst can be about 0.1 to about 10 wt % based on the weight of bisphenol in the phosgenation mixture. In another aspect an effective amount of phase transfer catalyst can be about 0.5 to about 2 wt % based on the weight of bisphenol in the phosgenation mixture.

All types of PC end groups are contemplated as being useful in the PC composition, provided that such end groups do not significantly adversely affect desired properties of the compositions.

Branched PC blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents can be added at a level of about 0.05 to about 2.0 wt %. Mixtures comprising linear PCs and branched PCs can be used.

A chain stopper (also referred to as a capping agent) can be included during polymerization. The chain stopper limits molecular weight growth rate, and so controls molecular weight in the PC. Exemplary chain stoppers include certain mono-phenolic compounds, mono-carboxylic acid chlorides, and/or mono-chloroformates. Mono-phenolic chain stoppers are exemplified by monocyclic phenols such as phenol and C$_1$-C$_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, C$_{1-22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the PCs or polyester-PCs. Generally, in the melt polymerization process, PCs can be prepared by co-reacting, in a molten state, the dihydroxy reactant(s) and a diaryl carbonate ester, such as diphenyl carbonate, in the presence of a transesterification catalyst in a BANBURY® mixer, twin screw extruder, or the like to form a uniform dispersion. Volatile monohydric phenol is removed from the molten reactants by distillation and the polymer is isolated as a molten residue. A specifically useful melt process for making PCs uses a diaryl carbonate ester having electron-withdrawing substituents on the aryls. Examples of specifically useful diaryl carbonate esters with electron withdrawing substituents include bis(4-nitrophenyl) carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing. In addition, transesterification catalysts for use can include phase transfer catalysts of formula (R$^3$)$_4$Q$^+$X above, wherein each R$^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Specifically, polyester-PCs, including the poly(aliphatic ester)-polycarbonates, can be prepared by interfacial polymerization. Rather than utilizing the dicarboxylic acid (such as the alpha, omega C$_{6-20}$ aliphatic dicarboxylic acid) per se, it is possible, and sometimes even preferred, to employ the reactive derivatives of the dicarboxylic acid, such as the corresponding dicarboxylic acid halides, and in particular the acid dichlorides and the acid dibromides. Thus, for example instead of using isophthalic acid, terephthalic acid, or a combination comprising at least one of the foregoing (for poly (arylate ester)-polycarbonates), it is possible to employ isophthaloyl dichloride, terephthaloyl dichloride, and a combination comprising at least one of the foregoing. Similarly, for the poly(aliphatic ester)-polycarbonates, it is possible, and even desirable, to use for example acid chloride derivatives such as a C$_6$ dicarboxylic acid chloride (adipoyl chloride), a C$_{10}$ dicarboxylic acid chloride (sebacoyl chloride), or a C$_{12}$ dicarboxylic acid chloride (dodecanedioyl chloride). The dicarboxylic acid or reactive derivative can be condensed with the dihydroxyaromatic compound in a first condensation, followed by in situ phosgenation to generate the carbonate linkages with the dihydroxyaromatic compound. Alternatively, the dicarboxylic acid or derivative can be condensed with the dihydroxyaromatic compound simultaneously with phosgenation.

In an aspect, where the melt volume rate (MVR) of an otherwise compositionally suitable poly(aliphatic ester)-polycarbonate is not suitably high, i.e., where the MVR is less than 13 cc/10 min when measured at 250° C., under a load of 1.2 kg, the poly(aliphatic ester)-polycarbonate can be modified to provide a reaction product with a higher flow (i.e., greater than or equal to 13 cc/10 min when measured at 250° C., under a load of 1.2 kg), by treatment using a redistribution catalyst under conditions of reactive extrusion. During reactive extrusion, the redistribution catalyst is typically included in small amounts of less than or equal to 400 ppm by weight, by injecting a dilute aqueous solution of the redistribution catalyst into the extruder being fed with the poly(aliphatic ester)-polycarbonate.

In an aspect, the redistribution-catalyst is a tetraalkylphosphonium hydroxide, tetraalkylphosphonium alkoxide, tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination comprising at least one of the foregoing catalysts, wherein each alkyl is independently a $C_{1-6}$ alkyl. In a specific aspect, a useful redistribution catalyst is a tetra $C_{1-6}$ alkylphosphonium hydroxide, $C_{1-6}$ alkyl phosphonium phenoxide, or a combination comprising one or more of the foregoing catalysts. An exemplary redistribution catalyst is tetra-n-butylphosphonium hydroxide.

In an aspect, the redistribution catalyst is present in an amount of 40 to 120 ppm, specifically 40 to 110 ppm, and more specifically 40 to 100 ppm, by weight based on the weight of the poly(aliphatic ester)-polycarbonate.

PCs as broadly defined above can further include blends of the above PCs with polyesters. Useful polyesters can include, for example, polyesters having repeating units of formula (1), which include poly(alkylene dicarboxylates), liquid crystalline polyesters, and polyester copolymers. The polyesters described herein are generally completely miscible with the PCs when blended.

Such polyesters generally include aromatic polyesters, poly(alkylene esters) including poly(alkylene arylates), and poly(cycloalkylene diesters). Aromatic polyesters can have a polyester structure according to formula (1), wherein D and T are each aromatic groups as described hereinabove. In an aspect, useful aromatic polyesters can include, for example, poly(isophthalate-terephthalate-resorcinol)esters, poly(isophthalate-terephthalate-bisphenol A)esters, poly[(isophthalate-terephthalate-resorcinol)ester-co-(isophthalate-terephthalate-bisphenol A)]ester, or a combination comprising at least one of these. Also contemplated are aromatic polyesters with a minor amount, e.g., about 0.5 to about 10 wt %, based on the total weight of the polyester, of units derived from an aliphatic diacid and/or an aliphatic polyol to make copolyesters. Poly(alkylene arylates) can have a polyester structure according to formula (1), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene. Examples of poly(alkylene terephthalates) include poly(ethylene terephthalate), poly(1,4-butylene terephthalate), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations comprising at least one of the foregoing polyesters can also be used.

Copolymers comprising alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexane-dimethanol-1,4-cyclohexanedicarboxylate) (PCCD), having recurring units of formula (4):

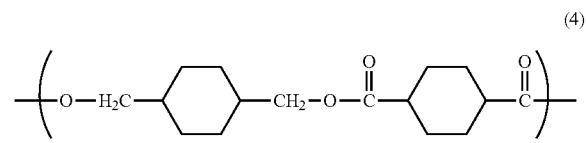

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Polyester-PC copolymers generally can have a weight average molecular weight (Mw) of 1,500 to 100,000 g/mol, specifically 1,700 to 50,000 g/mol. In an aspect, poly(aliphatic ester)-polycarbonates have a molecular weight of 15,000 to 45,000 g/mol, specifically 17,000 to 40,000 g/mol, more specifically 20,000 to 30,000 g/mol, and still more specifically 20,000 to 25,000 g/mol. Molecular weight determinations are performed using gel permeation chromatography (GPC), using a crosslinked styrene-divinylbenzene column and calibrated to PC references. Samples are prepared at a concentration of about 1 mg/ml, and are eluted at a flow rate of about 1.0 ml/min.

A polyester-PC can in general have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04 or ISO 1133. Commercial polyester blends with PC are marketed under the trade name XYLEX®, including for example XYLEX® X7300, and commercial polyester-polycarbonates are marketed under the tradename LEXAN® SLX polymers, including for example LEXAN® SLX-9000, and are available from SABIC Innovative Plastics (formerly GE Plastics).

In an aspect, poly(aliphatic ester)-polycarbonates have an MVR of about 13 to about 25 cc/10 min, and more specifically about 15 to about 22 cc/10 min, measured at 250° C. and under a load of 1.2 kilograms and a dwell time of 6 minutes, according to ASTM D1238-04. Also in an aspect, poly(aliphatic ester)-polycarbonates have an MVR of about 13 to about 25 cc/10 min, and more specifically about 15 to about 22 cc/10 min, measured at 250° C. and under a load of 1.2 kilograms and a dwell time of 4 minutes, according to ISO 1133.

In one aspect, the reactants for the polymerization reaction using an activated aromatic carbonate can be charged into a reactor either in the solid form or in the molten form. Initial charging of reactants into a reactor and subsequent mixing of these materials under reactive conditions for polymerization can be conducted in an inert gas atmosphere such as a nitrogen atmosphere. The charging of one or more reactants can also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all subranges there between, relative to the total moles of monomer unit compounds (i.e., aromatic dihydroxy compound, and aliphatic diacid or diol). In a specific aspect, the molar ratio of activated aromatic carbonate to monomer unit compounds is 1.013 to 1.29, specifically 1.015 to 1.028. In another specific aspect, the activated aromatic carbonate is BMSC.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give PCs with the desired molecular weight, glass transition temperature and physical properties. The reaction proceeds to build the PC chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final PC product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

In one aspect, the aliphatic homopolycarbonate and aliphatic-aromatic copolycarbonate can be prepared in an extruder in presence of one or more catalysts, wherein the carbonating agent is an activated aromatic carbonate. In one aspect, the reactants for the polymerization reaction can be fed to the extruder in powder or molten form. In another aspect, the reactants are dry blended prior to addition to the extruder. The extruder can be equipped with pressure reducing devices (e.g., vents), which serve to remove the activated phenol by-product and thus drive the polymerization reaction toward completion. The molecular weight of the PC product can, in various aspects, be manipulated by controlling, among other factors, the feed rate of the reactants, the type of extruder, the extruder screw design and configuration, the residence time in the extruder, the reaction temperature and the pressure reducing techniques present on the extruder. The molecular weight of the PC product can also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, and sidestreams. One skilled in the art can find the best designs using generally known principals of commercial extruder design. Controlling the ratio diarylcarbonate/diol, specifically BMSC/diol can impact the Mw when using an activated carbonate. A lower ratio can generally give a higher molecular weight.

In an exemplary aspect, the PC polymer comprises a bisphenol A PC polymer. In another exemplary aspect, the PC comprises a blend of at least two different grade bisphenol A PCs. To that end, a PC grade can, for example, be characterized by the MVR of the PC. For example, a disclosed PC, such as a bisphenol A PC, can be characterized by exhibiting a MVR in the range of from 4 g/10 min to 30 g/10 min at 300° C./1.2 kg. For example, the MVR can range from 10 g/10 min to 25 g/10 min, including for example a MVR in the range of from 15 g/10 min to 20 g/10 min. Further, for example, the MVR can be in the range of from 4 g/10 min or 30 g/10 min.

In a further aspect, the PC of the thermoplastic polymer matrix comprises Bisphenol A residues. In a still further aspect, the PC of the blended PC composition has a weight average molecular weight of from about 15,000 g/mol to about 100,000 g/mol on an absolute PC molecular weight scale. In a still further aspect, the PC of the blended PC composition has a weight average molecular weight of from about 20,000 g/mol to about 50,000 g/mol on an absolute PC molecular weight scale. In reference to the weight average molecular weight ($M_w$) of the PC component, it is understood that the $M_w$ is the absolute $M_w$ determined by gel permeation chromatography relative to traceable PC standards.

In aspects where the PC comprises a blend of two or more PC polymer components, it should be understood that each PC polymer component that is present within the PC can be present in any desired amount relative to the total amount of the PC polymer. For example, in an aspect wherein the PC polymer comprises at least a first and a second PC polymer component, the first PC polymer component can be present in an amount in the range of from greater than 0 weight % to less than 100 weight % relative to the total weight of the PC polymer. Similarly, the second PC polymer component can also be present in an amount in the range of from greater than 0 weight % to less than 100 weight % relative to the total weight of the PC polymer.

The PC can be present in the thermoplastic polymer matrix in any desired amount relative to the total amount of the thermoplastic polymer matrix. For example, wherein the PC is present in the thermoplastic polymer matrix it can be present in an amount in the range of from greater than 0 weight % to about 100 weight % relative to the total weight of the thermoplastic polymer matrix in the polymer composition, including exemplarily values of For example, the PC polymer can be present in an amount in the range of from greater than 0 weight % to about 100 weight % relative to the total weight of the thermoplastic polymer matrix in the polymer composition, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight 85 weight %, 90 weight %, and 95 weight % relative to the total weight of the thermoplastic polymer matrix in the polymer composition. In one aspect, the PC polymer can be present in exemplarily amount of 16 weight %, 17 weight %, 18 weight %, 19 weight %, 20 weight %, 21 weight %, and 22 weight %. In yet another aspect, the PC polymer can be present in exemplarily amount of 51 weight %, 52 weight %, 53 weight %, 54 weight %, 55 weight %, 56 weight %, 57 weight %, 58 weight %, 59 weight %, 60 weight %, 61 weight %, and 62 weight %. In still further aspects, the PC polymer can be present in the thermoplastic polymer matrix in any range derived from any two values set forth above. For example, the PC polymer can be present from about 10 weight % to about 80 weight %, from about 20 weight % to about 60 weight %, or from about 50 weight % to about 75 weight % relative to the total weight of the thermoplastic polymer matrix in the polymer composition.

In an aspect, wherein the thermoplastic polymer matrix comprises a blend of PC polymer and a polyester PC copolymer, the PC polymer can be present in an amount in the range of from greater than 0 weight % to less than 100 weight % relative to the total weight of the thermoplastic polymer matrix, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight 85 weight %, 90 weight %, and 95 weight % relative to the total weight of the thermoplastic polymer matrix in the polymer composition. In one aspect, the PC polymer can be present in exemplarily amount of 16 weight %, 17 weight %, 18 weight %, 19 weight %, 20 weight %, 21 weight %, and 22 weight %. In yet another aspect, the PC polymer can be present in exemplarily amount of 51 weight %, 52 weight %, 53 weight %, 54 weight %, 55 weight %, 56 weight %, 57 weight %, 58 weight %, 59 weight %, 60 weight %, 61 weight %, and 62 weight %.

Similarly, the polyester PC copolymer can also be present in an amount in the range of from greater than 0 weight % to less than 100 weight % relative to the total weight of the thermoplastic polymer matrix, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight 85 weight %, 90 weight %, and 95 weight % relative to the total weight of the thermoplastic polymer matrix in the polymer composition. In one aspect, the polyester PC copolymer can be present in exemplarily amount of 16 weight %, 17 weight %, 18 weight %, 19 weight %, 20 weight %, 21 weight %, and 22 weight %. In yet another aspect, the polyester PC copolymer can be present in exemplarily amount of 51 weight %, 52 weight %, 53 weight %, 54 weight %, 55 weight %, 56 weight %, 57 weight %, 58 weight %, 59 weight %, 60 weight %, 61 weight %, and 62 weight %.

B. Polyamide

In one aspect, the polymer composition can comprise a thermoplastic polymer matrix comprising one or more PAs. In one aspect, the PA can be present in the thermoplastic polymer matrix in any desired amount. For example, wherein the PA is present in the thermoplastic polymer matrix, it can be present in an amount in the range of from greater than 0 weight % to about 100 weight % relative to the total weight of the thermoplastic polymer matrix, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight 85 weight %, 90 weight %, and 95 weight % relative to the total weight of the thermoplastic polymer matrix in the polymer composition. In still further aspects, the PA can be present in the thermoplastic polymer matrix in any range derived from any two values set forth above. For example, the PA can be present from about 10 weight % to about 80 weight %, from about 20 weight % to about 60 weight %, or from about 50 weight % to about 75 weight % relative to the total weight of the thermoplastic polymer matrix in the polymer composition.

PAs are generally derived from the polymerization of organic lactams having from 4 to 12 carbon atoms. In one aspect, the lactam can have the formula

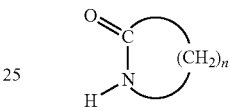

wherein n is about 3 to about 11. In one aspect, the lactam is epsilon-caprolactam having n equal to 5.

PAs can also be synthesized from amino acids having from 4 to 12 carbon atoms. In one aspect, the amino acids have the formula

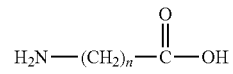

wherein n is about 3 to about 11. In one aspect, the amino acid is epsilon-aminocaproic acid with n equal to 5.

PAs can also be polymerized from aliphatic dicarboxylic acids having from 4 to 12 carbon atoms and aliphatic diamines having from 2 to 12 carbon atoms. In one aspect, the aliphatic diamines can have the formula

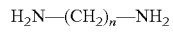

wherein n is about 2 to about 12. In one aspect, the aliphatic diamine is hexamethylenediamine ($H_2N(CH_2)_6NH_2$). The molar ratio of the dicarboxylic acid to the diamine can be about 0.66 to about 1.5. Within this range the molar ratio can be greater than or equal to about 0.81, or equal to about 0.96. In one aspect, this range is an amount of less than or equal to about 1.22, for example, less than or equal to about 1.04. In one aspect, the PAs are nylon 6, nylon 6,6, nylon 4,6, nylon 6, 12, nylon 10, or the like, or combinations including at least one of the foregoing nylons. In another aspect, the PA can be nylon 6. In another aspect, the PA can be nylon 6,6.

C. PEI

As disclosed, the polymer composition can comprise a thermoplastic polymer matrix comprising one or more PEIs. In one aspect, the PEIs can be present in the thermoplastic polymer matrix in any desired amount. For example, wherein the PEI is present in the thermoplastic polymer matrix, it can be present in an amount in the range of from greater than 0 weight % to about 100 weight % relative to the total weight of the thermoplastic polymer matrix, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight 85 weight %, 90 weight %, and 95 weight % relative to the total weight of the thermoplastic polymer matrix in the polymer composition. In still further aspects, the PEI can be present in the thermoplastic polymer matrix in any range derived from any two values set forth above. For example, the PEI can be present from about 10 weight % to about 80 weight %, from about 20 weight % to about 60 weight %, or from about 50 weight % to about 75 weight % relative to the total weight of the thermoplastic polymer matrix in the polymer composition.

In one aspect, PEIs includes PEI copolymers. The PEI can be selected from (i) PEI homopolymers, e.g., PEIs, (ii) PEI co-polymers, e.g., polyetherimidesulfones, and (iii) combinations thereof. PEIs are known polymers and are sold by SABIC Innovative Plastics under the ULTEM®*, EXTEM®*, and Siltem* brands (Trademarks of SABIC Innovative Plastics IP B.V.).

In one aspect, the PEIs can be of formula (1):

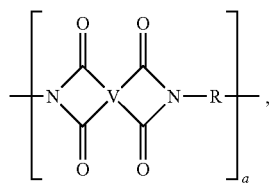

(1)

wherein a is more than 1, for example 10 to 1,000 or more, or more specifically 10 to 500. In one example, n can be 10-100, 10-75, 10-50 or 10-25.

The group V in formula (1) is a tetravalent linker containing an ether group (a "PEI" as used herein) or a combination of an ether groups and arylenesulfone groups (a "polyetherimidesulfone"). Such linkers include but are not limited to: (a) substituted or unsubstituted, saturated, unsaturated or aromatic monocyclic and polycyclic groups having 5 to 50 carbon atoms, optionally substituted with ether groups, arylenesulfone groups, or a combination of ether groups and arylenesulfone groups; and (b) substituted or unsubstituted, linear or branched, saturated or unsaturated alkyl groups having 1 to 30 carbon atoms and optionally substituted with ether groups or a combination of ether groups, arylenesulfone groups, and arylenesulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

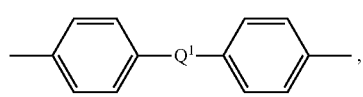

(2)

wherein Q1 includes but is not limited to a divalent moiety such as —O—, —S—, —C(O)—, —SO$_2$—, —SO—, —C$_y$H$_{2y}$- (y being an integer from 1 to 5), and halogenated derivatives thereof, including perfluoroalkylene groups.

In one aspect, linkers V include but are not limited to tetravalent aromatic groups of formula (3):

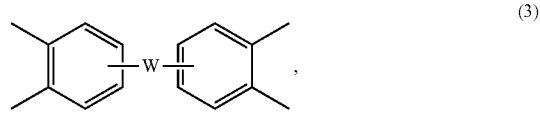

(3)

wherein W is a divalent moiety including —O—, —SO$_2$—, or a group of the formula —O—Z—O— wherein the divalent bonds of the —O— or the —O—Z—O— group are in the 3,3',3,4',4,3', or the 4,4' positions, and wherein Z includes, but is not limited, to divalent groups of formulas (4):

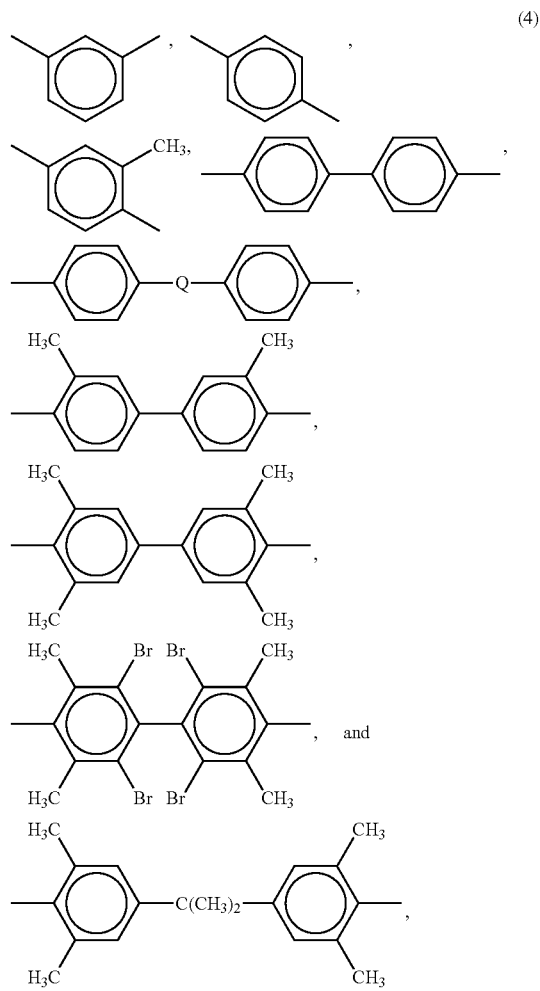

(4)

wherein Q includes, but is not limited to a divalent moiety including —O—, —S—, —C(O), —SO$_2$—, —SO—, —C$_y$H$_{2y}$— (y being an integer from 1 to 5), and halogenated derivatives thereof, including perfluoroalkylene groups.

In one aspect, the PEI comprise more than 1, specifically 10 to 1,000, or more specifically, 10 to 500 structural units, of formula (5):

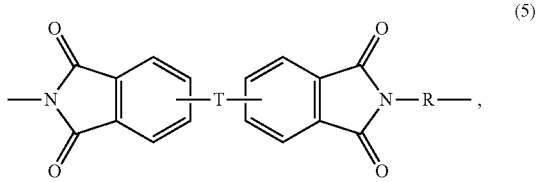

(5)

wherein T is —O— or a group of the formula —O—Z—O— wherein the divalent bonds of the —O— or the —O—Z—O— group are in the 3,3',3,4',4,3', or the 4,4' positions; Z is a divalent group of formula (3) as defined above; and R is a divalent group of formula (2) as defined above.

In another aspect, the polyetherimidesulfones are PEIs comprising ether groups and sulfone groups wherein at least 50 mole % of the linkers V and the groups R in formula (1) comprise a divalent arylenesulfone group. For example, all linkers V, but no groups R, can contain an arylenesulfone group; or all groups R but no linkers V can contain an arylenesulfone group; or an arylenesulfone can be present in some fraction of the linkers V and R groups, provided that the total mole fraction of V and R groups containing an aryl sulfone group is greater than or equal to 50 mole %.

In a further aspect, polyetherimidesulfones can comprise more than 1, specifically 10 to 1,000, or more specifically, 10 to 500 structural units of formula (6):

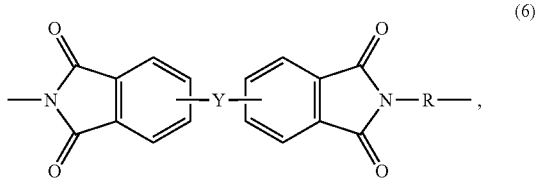

(6)

wherein Y is —O—, —SO$_2$—, or a group of the formula —O—Z—O— wherein the divalent bonds of the —O—, SO2-, or the —O—Z—O— group are in the 3,3',3,4',4,3', or the 4,4' positions, wherein Z is a divalent group of formula (3) as defined above and R is a divalent group of formula (2) as defined above, provided that greater than 50 mole % of the sum of moles Y+moles R in formula (2) contain —SO$_2$— groups.

It is to be understood that the PEIs and polyetherimidesulfones can optionally comprise linkers V that do not contain ether or ether and sulfone groups, for example linkers of formula (7):

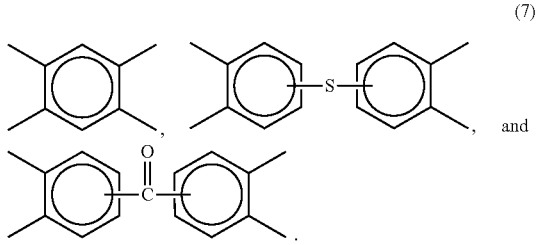

(7)

Imide units containing such linkers are generally be present in amounts ranging from 0 to 10 mole % of the total number of units, specifically 0 to 5 mole %. In one aspect, no additional linkers V are present in the PEIs and polyetherimidesulfones.

In another aspect, the PEI comprises 10 to 500 structural units of formula (5) and the polyetherimidesulfone contains 10 to 500 structural units of formula (6).

PEIs and polyetherimidesulfones can be prepared by any suitable process. In one aspect, PEIs and PEI copolymers include polycondensation polymerization processes and halo-displacement polymerization processes.

Polycondensation methods can include a method for the preparation of PEIs having structure (1) is referred to as the nitro-displacement process (X is nitro in formula (8)). In one example of the nitro-displacement process, N-methyl phthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and NaNO$_2$ in what is known as the nitro-displacement step. After purification, the BPA-bisimide is reacted with phthalic anhydride in an imide exchange reaction to afford BPA-dianhydride (BPADA), which in turn is reacted with a diamine such as meta-phenylene diamine (MPD) in ortho-dichlorobenzene in an imidization-polymerization step to afford the product PEI.

Other diamines are also possible. Examples of suitable diamines include: m-phenylenediamine; p-phenylenediamine; 2,4-diaminotoluene; 2,6-diaminotoluene; m-xylylenediamine; p-xylylenediamine; benzidine; 3,3'-dimethylbenzidine; 3,3'-dimethoxybenzidine; 1,5-diaminonaphthalene; bis(4-aminophenyl)methane; bis(4-aminophenyl)propane; bis(4-aminophenyl)sulfide; bis(4-aminophenyl)sulfone; bis(4-aminophenyl)ether; 4,4'-diaminodiphenylpropane; 4,4'-diaminodiphenylmethane(4,4'-methylenedianiline); 4,4'-diaminodiphenylsulfide; 4,4'-diaminodiphenylsulfone; 4,4'-diaminodiphenylether(4,4'-oxydianiline); 1,5-diaminonaphthalene; 3,3'dimethylbenzidine; 3-methylheptamethylenediamine; 4,4-dimethylheptamethylenediamine; 2,2',3,3'-tetrahydro-3,3,3',3'-tetramethyl-1,1'-spirobi[1H-indene]-6,6'-diamine; 3,3',4,4'-tetrahydro-4,4,4',4'-tetramethyl-2,2'-spirobi[2H-1-benzo-pyran]-7,7'-diamine; 1,1'-bis[1-amino-2-methyl-4-phenyl]cyclohexane, and isomers thereof as well as mixtures and blends comprising at least one of the foregoing. In one aspect, the diaminesare specifically aromatic diamines, especially m- and p-phenylenediamine and mixtures comprising at least one of the foregoing.

Suitable dianhydrides that can be used with the diamines include and are not limited to 2,2-bis[4-(3,4-dicarboxyphenoxy)phenyl]propane dianhydride; 4,4'-bis(3,4-dicarboxyphenoxy)diphenyletherdianhydride; 4,4'-bis(3,4-dicarboxyphenoxy)diphenylsulfidedianhydride; 4,4'-bis(3,4-dicarboxyphenoxy)benzophenonedianhydride; 4,4'-bis(3,4-dicarboxyphenoxy)diphenylsulfonedianhydride; 2,2-bis[4-(2,3-dicarboxyphenoxy)phenyl]propane dianhydride; 4,4'-bis(2,3-dicarboxyphenoxy)diphenyletherdianhydride; 4,4'-bis(2,3-dicarboxyphenoxy)diphenylsulfidedianhydride; 4,4'-bis(2,3-dicarboxyphenoxy)benzophenonedianhydride; 4,4'-bis(2,3-dicarboxyphenoxy)diphenylsulfonedianhydride; 4-(2,3-dicarboxyphenoxy)-4'-(3,4-dicarboxyphenoxy) diphenyl-2,2-propane dianhydride; 4-(2,3-dicarboxyphenoxy)-4'-(3,4-dicarboxyphenoxy)diphenyletherdianhydride; 4-(2,3-dicarboxyphenoxy)-4'-(3,4-dicarboxyphenoxy) diphenylsulfide dianhydride; 4-(2,3-dicarboxyphenoxy)-4'-(3,4-dicarboxyphenoxy)benzophenonedianhydride; 4-(2,3-dicarboxyphenoxy)-4'-(3,4-dicarboxyphenoxy) diphenylsulfone dianhydride; 1,3-bis(2,3-dicarboxyphenoxy)benzene dianhydride; 1,4-bis(2,3- dicarboxyphenoxy)benzene dianhydride; 1,3-bis(3,4-dicarboxyphenoxy)benzene dianhydride; 1,4-bis(3,4-dicarboxyphenoxy)benzene dianhydride; 3,3',4,4'-diphenyl tetracarboxylicdianhydride; 3,3',4,4'-benzophenonetetracarboxylic dianhydride; naphthalicdianhydrides, such as 2,3,6,7-naphthalic dianhydride, etc.; 3,3',4,4'-biphenylsulphonictetracarboxylic dianhydride; 3,3',4,4'-biphenylethertetracarboxylic dianhydride; 3,3',4,4'-dimethyldiphenylsilanetetracarboxylic dianhydride; 4,4'-bis (3,4-dicarboxyphenoxy)diphenylsulfidedianhydride; 4,4'-bis (3,4-dicarboxyphenoxy)diphenylsulphonedianhydride; 4,4'-bis(3,4-dicarboxyphenoxy)diphenylpropanedianhydride; 3,3',4,4'-biphenyltetracarboxylic dianhydride; bis(phthalic) phenylsulphineoxidedianhydride; p-phenylene-bis(triphenylphthalic)dianhydride; m-phenyl ene-bis(triphenylphthalic)dianhydride; bis(triphenylphthalic)-4,4'-diphenylether dianhydride; bis(triphenylphthalic)-4,4'-diphenylmethane dianhydride; 2,2'-bis(3,4-dicarboxyphenyl)hexafluoropropanedianhydride; 4,4'-oxydiphthalic dianhydride; pyromelliticdianhydride; 3,3',4,4'-diphenylsulfonetetracarboxylic dianhydride; 4',4'-bisphenol A dianhydride; hydroquinone diphthalic dianhydride; 6,6'-bis(3,4-dicarboxyphenoxy)-2,2',3,3'-tetrahydro-3,3,3',3'-tetramethyl-1-1,1'-spirobi[1H-indene]dianhydride; 7,7'-bis(3,4-dicarboxyphenoxy)-3,3',4,4'-tetrahydro-4,4,4',4'-tetramethyl-1-2,2'-spirobi[2H-1-benzopyran] dianhydride; 1,1'-bis[1-(3,4-dicarboxyphenoxy)-2-methyl-4-phenyl]cyclohexane dianhydride; 3,3',4,4'-diphenylsulfonetetracarboxylic dianhydride; 3,3',4,4'-diphenylsulfidetetracarboxylic dianhydride; 3,3',4,4'-diphenylsulfoxidetetracarboxylic dianhydride; 4,4'-oxydiphthalic dianhydride; 3,4'-oxydiphthalic dianhydride; 3,3'-oxydiphthalic dianhydride; 3,3'-benzophenonetetracarboxylic dianhydride; 4,4'-carbonyldiphthalic dianhydride; 3,3',4,4'-diphenylmethanetetracarboxylic dianhydride; 2,2-bis(4-(3,3-dicarboxyphenyl)propane dianhydride; 2,2-bis(4-(3,3-dicarboxyphenyl)hexafluoropropanedianhydride; (3,3',4,4'-diphenyl)phenylphosphinetetracarboxylicdianhydride; (3,3',4,4'-diphenyl)phenylphosphineoxidetetracarboxylicdianhydride; 2,2'-dichloro-3,3',4,4'-biphenyltetracarboxylic dianhydride; 2,2'-dimethyl-3,3',4,4'-biphenyltetracarboxylic dianhydride; 2,2'-dicyano-3,3',4,4'-biphenyltetracarboxylic dianhydride; 2,2'-dibromo-3,3',4,4'-biphenyltetracarboxylic dianhydride; 2,2'-diiodo-3,3',4,4'-biphenyltetracarboxylic dianhydride; 2,2'-ditrifluoromethyl-3,3',4,4'-biphenyltetracarboxylic dianhydride; 2,2'-bis(1-methyl-4-phenyl)-3,3',4,4'-biphenyltetracarboxylic dianhydride; 2,2'-bis(1-trifluoromethyl-2-phenyl)-3,3',4,4'-biphenyltetracarboxylic dianhydride; 2,2'-bis(1-trifluoromethyl-3-phenyl)-3,3',4,4'-biphenyltetracarboxylic dianhydride; 2,2'-bis(1-trifluoromethyl-4-phenyl)-3,3',4,4'-biphenyltetracarboxylic dianhydride; 2,2'-bis(1-phenyl-4-phenyl)-3,3',4,4'-biphenyltetracarboxylic dianhydride; 4,4'-bisphenol A dianhydride; 3,4'-bisphenol A dianhydride; 3,3'-bisphenol A dianhydride; 3,3',4,4'-diphenylsulfoxidetetracarboxylic dianhydride; 4,4'-carbonyldiphthalic dianhydride; 3,3',4,4'-diphenylmethanetetracarboxylic dianhydride; 2,2'-bis(1,3-trifluoromethyl-4-phenyl)-3,3',4,4'-biphenyltetracarboxylic dianhydride, and all isomers thereof, as well as combinations of the foregoing.

Halo-displacement polymerization methods for making PEIs and polyetherimidesulfones include and are not limited to, the reaction of a bis(phthalimide) for formula (8):

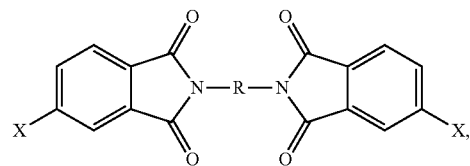

wherein R is as described above and X is a nitro group or a halogen. Bis-phthalimides (8) can be formed, for example, by the condensation of the corresponding anhydride of formula (9):

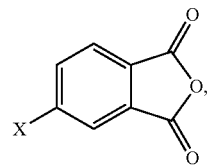

wherein X is a nitro group or halogen, with an organic diamine of the formula (10):

wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl) toluene, bis (p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl) ether and 1,3-bis(3-aminopropyl)tetramethyldisiloxane. Mixtures of these amines can be used. Illustrative examples of amine compounds of formula (10) containing sulfone groups include but are not limited to, diaminodiphenylsulfone (DDS) and bis(aminophenoxy phenyl) sulfones (BAPS). Combinations comprising any of the foregoing amines can be used.

The PEIs can be synthesized by the reaction of the bis (phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482, which is incorporated herein by reference in its entirety. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In one aspect, the PEI comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). Further, the polyetherimidesulfone comprises structural units of formula (6) wherein at least 50 mole % of the R groups are of formula (4) wherein Q is —$SO_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The PEI and polyetherimidesulfone can be used alone or in combination with each other and/or other of the disclosed polymeric materials in fabricating the polymeric components of the disclosure. In one aspect, only the PEI is used. In another aspect, the weight ratio of PEI: polyetherimidesulfone can be from 99:1 to 50:50.

The PEIs can have a weight average molecular weight (Mw) of 5,000 to 100,000 grams per mole (g/mole) as measured by gel permeation chromatography (GPC). In some aspects the Mw can be 10,000 to 80,000. The molecular weights as used herein refer to the absolute weight averaged molecular weight (Mw).

The PEIs can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The PEIs can have a glass transition temperature of greater than 180° C., specifically of 200° C. to 500° C., as measured using differential scanning calorimetry (DSC) per ASTM test D3418. In some aspects, the PEI and, in particular, a PEI has a glass transition temperature of 240 to 350° C.

The PEIs can have a melt index of 0.1 to 10 grams per minute (g/min), as measured by American Society for Testing Materials (ASTM) DI 238 at 340 to 370° C., using a 6.7 kilogram (kg) weight.

An alternative halo-displacement polymerization process for making PEIs, e.g., PEIs having structure (1) is a process referred to as the chloro-displacement process (X is Cl in formula (8)). The chloro-displacement process is illustrated as follows: 4-chloro phthalic anhydride and meta-phenylene diamine are reacted in the presence of a catalytic amount of sodium phenyl phosphinate catalyst to produce the bischlorophthalimide of meta-phenylene diamine (CAS No. 148935-94-8). The bischlorophthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride can be employed to provide a mixture of isomeric bischlorophthalimides which can be polymerized by chloro-displacement with BPA disodium salt as described above.

Siloxane PEIs can include polysiloxane/PEI block copolymers having a siloxane content of greater than 0 and less than 40 weight percent (wt %) based on the total weight of the block copolymer. The block copolymer comprises a siloxane block of Formula (11):

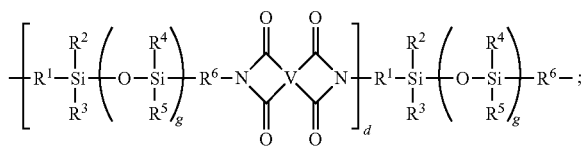

(11)

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted-alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstitutedalkenyl groups having 2 to 30 carbon atoms and combinations comprising at least one of the foregoing linkers, g equals 1 to 30, and d is 2 to 20. Commercially available siloxane PEIs can be obtained from SABIC Innovative Plastics under the brand name SILTEM* (*Trademark of SABIC Innovative Plastics IP B.V.)

The PEI resin can have a weight average molecular weight (Mw) within a range having a lower limit and/or an upper limit. The range can include or exclude the lower limit and/or the upper limit. The lower limit and/or upper limit can be selected from 5000, 10000, 15000, 20000, 25000, 30000, 35000, 40000, 45000, 50000, 55000, 60000, 65000, 70000, 75000, 80000, 85000, 90000, 95000, 100000, 105000, and 110000 Daltons. For example, the PEI resin can have a weight average molecular weight (Mw) from 5,000 to 100,000 Daltons, from 5,000 to 80,000 Daltons, or from 5,000 to 70,000 Daltons. The primary alkyl amine modified PEI will have lower molecular weight and higher melt flow than the starting, unmodified, polyetherimide.

In a further aspect, the PEI has a structure represented by a formula:

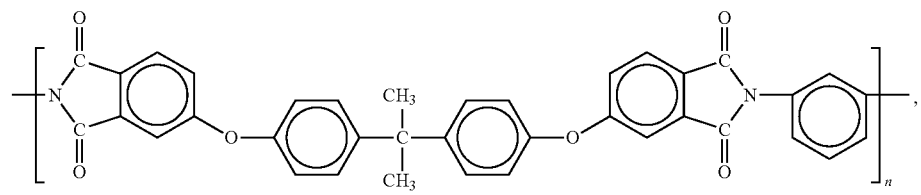

wherein the PEI polymer has a molecular weight of at least 20,000, 30,000, 40,000 Daltons, 50,000 Daltons, 60,000 Daltons, 80,000 Daltons, or 100,000 Daltons.

In one aspect, the PEI comprises

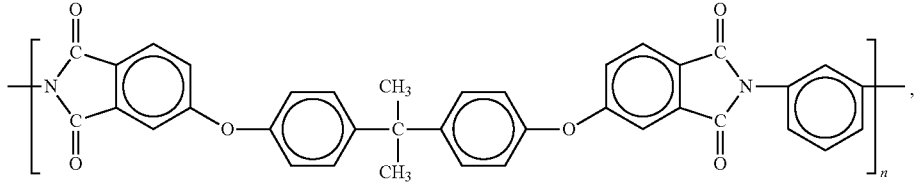

wherein n is greater than 1, for example greater than 10. In one aspect n is between 2-100, 2-75, 2-50 or 2-25, for example 10-100, 10-75, 10-50 or 10-25. In another example, n can be 38, 56 or 65.

The PEI resin can be selected from the group consisting of a PEI, for example as described in U.S. Pat. Nos. 3,875,116; 6,919,422 and 6,355,723 a silicone PEI, for example as described in U.S. Pat. Nos. 4,690,997; 4,808,686 a polyetherimidesulfone resin, as described in U.S. Pat. No. 7,041,773 and combinations thereof, each of these patents are incorporated herein their entirety.

The PEI resin can have a glass transition temperature within a range having a lower limit and/or an upper limit. The range can include or exclude the lower limit and/or the upper limit. The lower limit and/or upper limit can be selected from 100, 120, 140, 160, 180, 200, 220, 240, 260, 280, 300 and 320 degrees Celsius. For example, the PEI resin can have a glass transition temperature (Tg) greater than about 200 degrees Celsius.

The PEI resin can be substantially free (less than 100 ppm) of benzylic protons. The PEI resin can be free of benzylic protons. The PEI resin can have an amount of benzylic protons below 100 ppm. In one aspect, the amount of benzylic protons ranges from more than 0 to below 100 ppm. In another aspect, the amount of benzylic protons is not detectable.

The PEI resin can be substantially free (less than 100 ppm) of halogen atoms. The PEI resin can be free of halogen atoms. The PEI resin can have an amount of halogen atoms below 100 ppm. In one aspect, the amount of halogen atoms range from more than 0 to below 100 ppm. In another aspect, the amount of halogen atoms is not detectable.

Suitable PEIs that can be used in the disclosed composites include, but are not limited to, ULTEM®. ULTEM® can have elevated thermal resistance, high strength and stiffness, and broad chemical resistance. ULTEM®, as used herein, refers to any or all ULTEM® polymers included in the family unless otherwise specified. In a further aspect, the ULTEM® is ULTEM® Resin 1000. In one aspect, a PEI can comprise any PC material or mixture of materials, for example, as recited in U.S. Pat. Nos. 4,548,997; 4,629,759; 4,816,527; 6,310,145; and 7,230,066, all of which are hereby incorporated in its entirety for the specific purpose of disclosing various PEI compositions and methods.

D. Polyalkylene Terephthalate

As disclosed, the polymer composition can comprise a thermoplastic polymer matrix comprising one or more polyalkylene terephthalates. In one aspect, the polyalkylene terephthalates can be present in the thermoplastic polymer matrix in any desired amount. For example, wherein the polyalkylene terephthalate is present in the thermoplastic polymer matrix, it can be present in an amount in the range of from greater than 0 weight % to about 100 weight % relative to the total weight of the thermoplastic polymer matrix, including exemplarily values of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight 85 weight %, 90 weight %, and 95 weight % relative to the total weight of the thermoplastic polymer matrix in the polymer composition. In still further aspects, the polyalkylene terephthalate can be present in the thermoplastic polymer matrix in any range derived from any two values set forth above. For example, the polyalkylene terephthalate can be present from about 10 weight % to about 80 weight %, from about 20 weight % to about 60 weight %, or from about 50 weight % to about 75 weight % relative to the total weight of the thermoplastic polymer matrix in the polymer composition.

In one aspect, the polyalkylene terephthalate can be selected form PET, PBT, polyethylene naphthalate (PEN), polybutylene naphthalate (PBN), and poly1,3-propylene terephthalate (PPT). In one aspect, the polyalkylene terephthalate can be polyethylene terephthalate. In another aspect, the polyalkylene terephthalate can be PBT. Other suitable polyalkylene terephthalates include poly(1,4-cyclohexylene-dimethylene terephthalate) (PCT), poly(1,4-cyclohexylene-dimethylene cyclohexane-1,4-dicarboxylate) also known as poly(cyclohexane-14-dimethanol cyclohexane-1,4-dicarboxylate) (PCCD), and poly(1,4-cyclohexylenedimethylene terephthalate-co-isophthalate) (PCTA).

In one aspect, the polyalkylene terephthalate can have a molecular weight of less than 10,000 Daltons. In another aspect, the polyalkylene terephthalate can have a molecular weight of less than 20,000 Daltons. In yet another aspect, the polyalkylene terephthalate can have a molecular weight of less than 30,000 Daltons.

In one aspect, the polyalkylene terephthalate can have a molecular weight from 1,000 Daltons to 100,000 Daltons.

2. Polytetrafluoroethylene Polymer

In one aspect, the polymer composition can comprise a particulate polytetrafluoroethylene (PTFE) additive dispersed within the thermoplastic polymer matrix, wherein the particulate polytetrafluoroethylene additive has an average particle size less than 50 µm. As used herein, the term "PTFE" includes polytetrafluoroethylene as well as its derivatives, composites and copolymers thereof, wherein the bulk of the copolymer material is polytetrafluoroethylene, including copolymers of tetrafluoroethylene and hexafluoro(propyl vinyl ether), copolymers of tetrafluoroethylene and perfluoro-2,2-dimethyl-1,3-dioxole, and copolymers of tetrafluoroethylene and vinyl fluoride, poly(vinyl fluoride), poly (vinylidene fluoride), polychlorotrifluoroethylene, vinyl fluoride/vinylidene fluoride copolymer, and vinylidene fluoride/hexafluoropropylene copolymer. Where the term "PTFE" is used herein to describe polytetrafluoroethylene that is copolymerized with one of the above-named polymers, it is contemplated that the actual polytetrafluoroethylene content in the copolymer is about 80% by weight, or higher.

In one aspect, the amount of the polytetrafluoroethylene additive dispersed within the thermoplastic polymer matrix, wherein the particulate polytetrafluoroethylene additive has an average particle size less than 50 μm can be within the range of from about 5 weight % to about 20 weight % of the total weight of the polymer composition, including exemplarily values of from about 8 weight %, 10 weight %, 12 weight %, 14 weight %, 16 weight %, and 18 weight %. In still further aspects, the polymer composition can comprise the polytetrafluoroethylene additive in any range derived from any two values set forth above. For example, the polytetrafluoroethylene additive can be present from about 8 weight % to about 20 weight %, from about 10 weight % to about 20 weight %, or from about 15 weight % to about 20 weight % of the total weight of the polymer composition.

In one aspect, the polymer composition can comprise a particulate polytetrafluoroethylene (PTFE) additive dispersed within the thermoplastic polymer matrix, wherein the particulate polytetrafluoroethylene additive has an average particle size less than 50 μm. In another aspect, the disclosed tetrafluorethylene polymer has an average particle size less than 40 μm, including exemplarily values of less than 38 μm, 46 μm, 44 μm, 42 μm, 30 μm, 28 μm, 26 μm, 24 μm, 22 μm, 20 μm, 18 μm, 16 μm, 14 μm, 13, 12 μm, 10 μm, 8 μm, 6 μm, 4 μm, and 2 μm. In still further aspects, the composition can comprise the particulate polytetrafluoroethylene (PTFE) additive dispersed within the thermoplastic polymer matrix having an average particle size in any range derived from any value set forth above. For example, the tetrafluoroethylene polymer can be have an average particle size less than about 25 μm, less than 20 μm, less than 10 μm, or less than 5 μm. In one aspect, the disclosed tetrafluoroethylene polymer has an average particle size less than 7 μm, 6 μm, 5 μm, 4 μm, 3 μm, 2 μm, and 1 μm.

In various aspects, the particulate polytetrafluoroethylene (PTFE) additive can have any desired particle size distribution characteristic. For example, in one aspect, the particle size distribution characteristics can be predetermined values of $D_{(n)}$, where (n) represents a mass percentage such as 1%, 5%, 10%, 15%, 20%, 25%, 30%, 35%, 40%, 45%, 50%, 55%, 60%, 65%, 70%, 75%, 80%, 85%, 90%, 95%, 99% or 100%. The value of $D_{(n)}$ thus represents the particle size of which (n) percentage of the mass is finer than. For example, the quantity $D_{(100)}$ represents the particle size of which 100% of a mass is finer than. The quantity $D_{(90)}$ represents the particle size of which 90% of a mass is finer than. The quantity $D_{(85)}$ is the median particle size of a mass for which 85% of the mass is finer than. The quantity $D_{(75)}$ represents the particle size of which 75% of a mass is finer than. The quantity $D_{(60)}$ represents the particle size of which 60% of a mass is finer than. The quantity $D_{(50)}$ represents the particle size of which 50% of a mass is finer than. The quantity $D_{(25)}$ is the median particle size of a mass for which 25% of the mass is finer than. The quantity $D_{(10)}$ represents the particle size of which 10% of a mass is finer than. The quantity $D_{(1)}$ represents the particle size of which 1% of a mass is finer than.

In various further aspects, the particulate polytetrafluoroethylene (PTFE) additive has a particle size distribution, wherein at least 90 weight % of the particulate polytetrafluoroethylene additive particles are smaller than a predetermined size, including exemplary values of at least about 91, 92, 93, 94, 95, 96, 97, 98, 99, 100 weight %. For example, in one aspect, at least 90 weight % of the particulate polytetrafluoroethylene additive particles are smaller than 60 μm. In another aspect, at least 90 weight % of the particulate polytetrafluoroethylene additive particles are smaller than 55 μm. In another aspect, at least 90 weight % of the particulate polytetrafluoroethylene additive particles are smaller than 50 μm. In another aspect, at least 90 weight % of the particulate polytetrafluoroethylene additive particles are smaller than 45 μm. In another aspect, at least 90 weight % of the particulate polytetrafluoroethylene additive particles are smaller than 40 μm. In another aspect, at least 90 weight % of the particulate polytetrafluoroethylene additive particles are smaller than 35 μm. In another aspect, at least 90 weight % of the particulate polytetrafluoroethylene additive particles are smaller than 30 μm. In another aspect, at least 90 weight % of the particulate polytetrafluoroethylene additive particles are smaller than 25 μm. In another aspect, at least 90 weight % of the particulate polytetrafluoroethylene additive particles are smaller than 20 μm. In another aspect, at least 90 weight % of the particulate polytetrafluoroethylene additive particles are smaller than 15 μm. In another aspect, at least 90 weight % of the particulate polytetrafluoroethylene additive particles are smaller than 10 μm.

3. Fillers

The disclosed polymer composition further comprises one or more fillers. The filler can be selected to impart additional impact strength and/or provide additional characteristics that can be based on the final selected characteristics of the polymer composition. The specific composition of a filler can vary, provided that the filler is chemically compatible with the remaining components of the polymer composition.

In another aspect, the filler comprises, for example, $TiO_2$; fibers comprising asbestos or the like fibers; silicates and silica powders, aluminum silicate (mullite), synthetic calcium silicate, zirconium silicate, fused silica, crystalline silica graphite, natural silica sand, or the like; boron powders, boron-nitride powder, boron-silicate powders, or the like; alumina; magnesium oxide (magnesia); calcium sulfate (as its anhydride, dihydrate or trihydrate); calcium carbonates, chalk, limestone, marble, synthetic precipitated calcium carbonates, or the like; talc, including but not limited to fibrous, modular, needle shaped, lamellar talc, or the like; wollastonite; surface-treated wollastonite; glass spheres including but not limited to hollow and solid glass spheres, silicate spheres, cenospheres, aluminosilicate (armospheres), or the like; kaolin, including but not limited to hard kaolin, soft kaolin, calcined kaolin, kaolin including various coatings known in the art to facilitate compatibility with the polymeric matrix resin, or the like; single crystal fibers or "whiskers" including but not limited to silicon carbide, alumina, boron carbide, iron, nickel, copper, or the like; glass fibers, (including continuous and chopped fibers), including but not limited to E, A, C, ECR, R, S, D, and NE glasses and quartz, or the like; sulfides including but not limited to molybdenum sulfide, zinc sulfide or the like; barium compounds including but not limited to barium titanate, barium ferrite, barium sulfate, heavy spar, or the like; metals and metal oxides including but not limited to particulate or fibrous aluminum, bronze, zinc, copper and nickel or the like; flaked fillers including but not limited to as glass flakes, flaked silicon carbide, aluminum diboride, aluminum flakes, steel flakes or the like; fibrous fillers, for example short inorganic fibers including but not limited to those derived from blends including at least one of aluminum silicates, aluminum oxides, magnesium oxides, and calcium sulfate hemihydrate or the like; natural fillers and reinforcements, including but not limited to wood flour obtained by pulverizing wood, fibrous products such as cellulose, cotton, sisal, jute, starch, cork flour, lignin, ground nut shells, corn, rice grain husks or the like; reinforcing organic fibrous fillers formed from organic polymers capable of forming fibers including but not limited to poly(ether ketone), polyimide, polybenzoxazole, poly(phenylene sulfide), polyesters, polyethylene, aromatic PAs, aromatic polyimides, PEIs, polytetrafluoroethylene, acrylic resins, poly(vinyl alcohol) or the like; as well as additional fillers and reinforcing agents including but not limited to mica, clay, feldspar, flue dust, fillite, quartz, quartzite, perlite, tripoli, diatomaceous earth, carbon black, or the like, or combinations including at least one of the foregoing fillers or reinforcing agents.

In one aspect, the filler comprises a reinforcment filler. In one aspect, the disclosed polymer composition further comprises a reinforcment filler comprising a carbon fiber, carbon black, glass fiber, aramid fiber, or a combination thereof.

In a yet further aspect, the reinforcment filler comprises a glass fiber, wherein the glass fiber has a cross section that can be round or flat. In another aspect, the glass fiber, for example, can be Nittobo (flat) glass fiber, CSG3PA820. In an even further aspect, the glass bead has a cross section that is round or flat.

The reinforcment filler can be present in the polymer composition in an amount in the range of from greater than 0 weight % to about 40 weight %, including exemplary values of 5 weight %, 10 weight %, 15 weight %, 20 weight %, 25 weight %, 30 weight %, and 35 weight % relative to the total weight of the polymer composition. In still further aspects, the composition can comprise the reinforcement filler in any range derived from any two values set forth above. For example, the reinforcement filler can be present from about 5 weight % to about 25 weight %, from about 10 weight % to about 30 weight %, or from about 15 weight % to about 20% weight % realtive to the total weight of the polymer composition.

G. Optional Polymer Composition Additives

The disclosed polymer composition can optionally comprise one or more additives conventionally used in the manufacture of molded polymer parts with the proviso that the optional additives do not adversely affect the desired properties of the resulting composition. Mixtures of optional additives can also be used. Such additives can be mixed at a suitable time during the mixing of the components for forming the composite mixture. For example, the disclosed composition can comprise one or more fillers, plasticizers, stabilizers, anti-static agents, flame-retardants, impact modifiers, colorant, antioxidant, and/or mold release agents. In one aspect, the composition further comprises one or more optional additives selected from an antioxidant, impact modifier, flame retardant, inorganic filler, and stabilizer.

Exemplary heat stabilizers include, for example, organo phosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Exemplary antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Exemplary light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Exemplary plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Exemplary antistatic agents include, for example, glycerol monostearate, sodium stearyl sulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the composition electrostatically dissipative.

Exemplary mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Exemplary UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl) oxy]-2,2-bis[[(2-cyano-3,3-diphenylacryloyl)oxy]methyl] propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

Exemplary lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Exemplary blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Exemplary impact modifier of the present disclosure include but not limited to, for example, an acrylonitrile-butadiene-styrene polymer (ABS), an acrylonitrile-styrene-butyl acrylate (ASA) polymer, a methyl methacrylate-acrylonitrile-butadiene-styrene (MABS) polymer, a methyl methacrylate-butadiene-styrene (MBS) polymer, and an acrylonitrile-ethylene-propylene-diene-styrene (AES) polymer. In a still further aspect, the impact modifier is an acrylonitrile-butadiene-styrene polymer ("ABS polymer"). In a still further aspect, a suitable impact modifier is a bulk polymerized ABS polymer ("BABS polymer" or "Bulk ABS polymer").

As noted above, the disclosed polymer composition can optionally further comprises a flame retardant additive. In various aspects, the flame retardant additive can comprise any flame retardant material or mixture of flame retardant materials suitable for use in the inventive polymer composition. In another aspect, the flame retardant additive comprises a phosphate containing material. In another aspect, the flame retardant additive comprises a halogen containing material.

In one aspect, a flame retardant additive includes, for example, flame retardant salts such as alkali metal salts of perfluorinated $C_{1-6}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoroanion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS, alone or in combination with other flame retardants, are particularly useful in the PC compositions disclosed herein.

In another aspect, a flame retardant additive can also include organic compounds that include phosphorus, bromine, and/or chlorine. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

In other aspects, the flame retardant additive is free of or substantially free of one or more of phosphate and/or a halogen. In still another aspect, the flame retardant additive comprises an oligomer organophosphorous flame retardant, including for example, bisphenol A diphenyl phosphate (BPADP). In a further aspect, the flame retardant is selected from oligomeric phosphate, polymeric phosphate, oligomeric phosphonate, or mixed phosphate/phosphonate ester flame retardant composition. In a still further aspect, the flame retardant is selected from triphenyl phosphate; cresyl-diphenylphosphate; tri(isopropylphenyl)phosphate; resorcinol bis(diphenylphosphate); and bisphenol-A bis(diphenyl phosphate). In a yet further aspect, the flame retardant is bisphenol-A bis(diphenyl phosphate).

Additionally, materials to improve flow and other properties can be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

In aspect, the disclosed polymer composition is capable of being activated by a laser. In another aspect, the disclosed polymer composition is capable of being molded into an article.

II. Methods of Manufacture

In a further aspect, the disclosure relates to a method for making a polymer composition, the method comprising a) combining: i) from about 55% by weight to about 95% by weight of a thermoplastic polymer matrix; and ii) from about 5% by weight to about 20% by weight of a particulate polytetrafluoroethylene additive dispersed with the thermopplastic polymer matrix, wherein the particulate polytetrafluoroethyle additive has an average particle size less than 50 µm; and iii) from greater than 0 weight % to about 40 weight % of a reinforcement filler dispersed within the thermoplastic polymer matrix.

In another aspect, the disclosure also relates to a method for making for making a polymer composition, the method comprising a) combining: i) from about 55% by weight to about 95% by weight of a thermoplastic polymer matrix; and ii) from about 5% by weight to about 20% by weight of a particulate polytetrafluoroethylene additive dispersed with the thermopplastic polymer matrix, wherein the particulate polytetrafluoroethyle additive has an average particle size less than 50 µm; and wherein at least 90 weight % of the particulate polytetrafluoroethylene additive particles are smaller than 60 µm; and iii) from greater than 0 weight % to about 40 weight % of a reinforcement filler dispersed within the thermoplastic polymer matrix.

As described herein, the present disclosure relates to a method of making a polymer composition. The polymer composition of the present disclosure can be formed using any known method of combining multiple components to form a polymer resin. In one aspect, the components are first blended in a high-speed mixer. Other low shear processes including but not limited to hand mixing can also accomplish this blending. The blend is then fed into the throat of a twin-screw extruder via a hopper. Alternatively, one or more of the components can be incorporated into the composition by feeding directly into the extruder at the throat and/or downstream through a sidestuffer. The extruder is generally operated at a temperature higher than that necessary to cause the composition to flow. The extrudate is immediately quenched in a water batch and pelletized. The pellets so prepared when cutting the extrudate can be one-fourth inch long or less as desired. Such pellets can be used for subsequent molding, shaping, or forming. In one aspect, the blend composition is formed by extrusion blending.

In one aspect, the method comprises making a polymer composition wherein the thermoplastic polymer matrix can be provided in any desired amount. For example, according to aspects of the disclosure, the thermoplastic polymer matrix can be provided in an amount in the range from about 55 weight % to about 95 weight %, including further exemplary amounts of including exemplary values of about 60 weight %, 65 weight %, 70 weight %, 75 weight %, 80 weight %, 85 weight %, and about 90 weight % relative to the total weight of the polymer composition. In still further aspects, the thermoplastic polymer matrix can be present in any range derived from any two values set forth above. For example, the thermoplastic polymer matrix can be present from about 55 weight % to about 80 weight % t, from about 60 weight % to about 80 weight %, or from about 60 weight % to about 75 weight % relative to the total weight of the polymer composition.

In another aspect, the method comprises making a polymer composition wherein the thermoplastic polymer matrix comprises at least one polymer selected from a group consisting of a PC, a PC copolymer, a PA, a PEI, a PBT, and a PET. In one aspect, the thermoplastic polymer matrix comprises a PC. In another aspect, the thermoplastic polymer matrix comprises a bisphenol A PC polymer. In yet another aspect, the thermoplastic polymer matrix comprises a polyester PC.

In one aspect, the method disclosed herein, comprises making a polymer composition, combining from about 5% by weight to about 20% by weight of a particulate polytetrafluoroethylene additive dispersed with the thermopplastic polymer matrix, wherein the particulate polytetrafluoroethyle additive has an average particle size less than 50 µm. In one aspect, the amount of the particulate polytetrafluoroethylene additive dispersed with the thermopplastic polymer matrix, wherein the particulate polytetrafluoroethyle additive has an average particle size less than 50 µm and which is incorporated into the polymer composition by the process of the disclosure can be within the range of from about 5 weight % to about 20 weight %, including exemplarily values of from about 8 weight %, 10 weight %, 12 weight %, 14 weight %, 16 weight %, and 18 weight % realtive to the total weight of the polymer composition. In still further aspects, the composition can comprise the particulate polytetrafluoroethylene additive dispersed with the thermopplastic polymer matrix, wherein the particulate polytetrafluoroethyle additive has an average particle size less than 50 µm in any range derived from any two values set forth above. For example, particulate polytetrafluoroethylene additive dispersed with the thermopplastic polymer matrix, wherein the particulate polytetrafluoroethyle additive has an average particle size less than 50 µm can be present from about 8% by weight to about 20 weight %, from about 10 weight % to about 20 weight %, or from about 15 weight % to about 20 weight % realtive to the total weight of the polymer composition.

In one aspect, the polymer composition can comprises the particulate polytetrafluoroethylene additive dispersed with the thermopplastic polymer matrix, wherein the particulate polytetrafluoroethyle additive has an average particle size less than 50 µm. In another aspect, the disclosed tetrafluorethylene polymer has an average particle size less than 40 µm, including exemplarily values of less than 38 µm, 46 µm, 44 µm, 42 µm, 30 µm, 28 µm, 26 µm, 24 µm, 22 µm, 20 µm, 18 µm, 16 µm, 14 µm, 13, 12 µm, 10 µm, 8 µm, 6 µm, 4 µm, and 2 µm. In still further aspects, the composition can comprise the particulate polytetrafluoroethylene (PTFE) additive dispersed within the thermoplastic polymer matrix having an average particle size in any range derived from any value set forth above. For example, the tetrafluorethylene polymer can be have an average particle size less than about 25 µm, less than 20 µm, less than 10 µm, or less than 5 µm. In one aspect, the disclosed tetrafluorethylene polymer has an average particle size less than 7 µm, 6 µm, 5 µm, 4 µm, 3 µm, 2 µm, and 1 µm.

In one aspect, the method of making the disclosed composition can further comprise combining from greater than 0% by weight to about 40% by weight of a reinforcement filler. In another aspect, the reinforcement filler can comprises a carbon fiber, carbon black, glass fiber, aramid fiber, or a combination thereof. In one aspect the reinforcement filler present in exemplary values of 5 weight %, 10 weight %, 15 weight %, 20 weight %, 25 weight %, 30 weight %, and 35 weight % relative to the total weight of the polymer composition. In still further aspects, the composition can comprise the reinforcement filler in any range derived from any two values set forth above. For example, the reinforcement filler can be present from about 5 weight % to about 25 weight %, from about 10 weight % to about 30 weight %, or from about 15 weight % to about 20% weight % realtive to the total weight of the polymer composition.

In one aspect, disclosed herein is the method of making a polymer composition, wherein the formed composition exhibits a wear factor of less than 3500 as determined by a test according to ASTM D3702 at 40 psi and 50 fpm. In another aspect, the polymer composition formed by the method disclosed herein exhibits a wear factor of less than 2500 as determined by a test according to ASTM D3702 at 40 psi and 50 fpm. In yet another aspect, the polymer composition formed by the method disclosed herein exhibits a wear factor of less than 1000 as determined by a test according to ASTM D3702 at 40 psi and 50 fpm. In a further aspect, the polymer composition formed by the method disclosed herein exhibits a wear factor of less than 750 as determined by a test according to ASTM D3702 at 40 psi and 50 fpm. In a yet further aspect, the polymer composition formed by the method disclosed herein exhibits a wear factor of less than 500 as determined by a test according to ASTM D3702 at 40 psi and 50 fpm. In yet another aspect, the polymer composition formed by the method disclosed herein exhibits a wear factor of less than 300 as determined by a test according to ASTM D3702 at 40 psi and 50 fpm. In still another aspect, the polymer composition formed by the method disclosed herein exhibits a wear factor of less than 200 as determined by a test according to ASTM D3702 at 40 psi and 50 fpm. In a further aspect, the polymer composition formed by the method disclosed herein exhibits a wear factor of less than 150 as determined by a test according to ASTM D3702 at 40 psi and 50 fpm. In a still further aspect, the polymer composition formed by the method disclosed herein exhibits a wear factor of less than 120 as determined by a test according to ASTM D3702 at 40 psi and 50 fpm.

In one aspect, the polymer composition formed by the method disclosed herein exhibits a low particulate contamination. In one aspect, the polymer composition formed by the method disclosed herein exhibits a low particulate contamination with liquid particle counts (LPC) of less than $1\times10^5$. In another aspect, the polymer composition formed by the method disclosed herein exhibits a low particulate contamination with liquid particle counts (LPC) of less than $6\times10^4$. In one aspect, the polymer composition formed by the method disclosed herein exhibits a low particulate contamination with liquid particle counts (LPC) of less than $3\times10^4$. In yet another aspect, the polymer composition formed by the method disclosed herein exhibits a low particulate contamination with liquid particle counts (LPC) of less than $1\times10^4$. In yet another aspect, the polymer composition formed by the method disclosed herein exhibits a low particulate contamination with liquid particle counts (LPC) of less than $5\times10^3$.

In other aspects, the disclosure also relates to methods for lowering particulate contamination in a polymer composition, the method comprising a) combining: i) from about 55% by weight to about 95% by weight of a thermoplastic polymer matrix; and ii) from about 5% by weight to about 20% by weight of a particulate polytetrafluoroethylene additive dispersed with the thermopplastic polymer matrix, wherein the particulate polytetrafluoroethyle additive has an average particle size less than 50 μm; and iii) from greater than 0 weight % to about 40 weight % of a reinforcement filler dispersed within the thermoplastic polymer matrix.

3. Articles of Manufacture

A shaped, formed, or molded article including the polymer composition is also provided. The polymer composition can be molded into useful shaped articles by a variety of means such as injection molding, extrusion, rotational molding, blow molding and thermoforming to form articles such as, for example, hard disk drive devices, personal computers, notebook and portable computers, smart phone devices, household appliances, electromagnetic interference devices, Wi-Fi devices, Bluetooth devices, GPS devices cell phone antennas and other such communications equipment, medical applications, RFID applications, automotive applications, and the like. In one aspect the polymer composition is molded into an article. In one aspect, the article is a component part for an electronic device.

In another aspect, the electronic device is a hard drive disk. In yet another aspect, the article can be a latch. In a further aspect, the article can be a ramp. In a yet further aspect, the article can be a bracket.

The disclosed compositions and methods include at least the following aspects.

Aspect 1: A polymer composition comprising:
a) from about 55 weight % to about 95 weight % of a thermoplastic polymer matrix;
b) from about 5 weight % to about 20 weight % of a particulate polytetrafluoroethylene additive dispersed within the thermoplastic polymer matrix, wherein the particulate polytetrafluoroethylene additive has an average particle size less than 40 μm, and wherein at least 90 weight % of the particulate polytetrafluoroethylene additive particles are smaller than 60 μm; and
c) from greater than 0 weight % to about 40 weight % of a reinforcment filler dispersed within the thermoplastic polymer matrix.

Aspect 2: The polymer composition of aspect 1, wherein the thermoplastic polymer matrix comprises at least one polymer selected from the group consisting of a PC, a PC copolymer, a PA, a PEI, a PBT, and a PET.

Aspect 3: The polymer composition of any one of aspects 1-2, wherein the thermoplastic polymer matrix comprises a PC.

Aspect 4: The polymer composition of any one of aspects 1-3, wherein the thermoplastic polymer matrix comprises a bisphenol A PC polymer.

Aspect 5: The polymer composition of any one of aspects 1-4, wherein the thermoplastic polymer matrix comprises a polyester PC copolymer.

Aspect 6: The polymer composition of any one of aspects 1-5, wherein the thermoplastic polymer matrix is present in an amount of from about 60 weight percent to about 80 weight percent relative to the total weight of the polymer composition.

Aspect 7: The polymer composition of any one of aspects 1-6, wherein the particulate polytetrafluoroethylene additive has an average particle size less than 40 μm.

Aspect 8: The polymer composition of any one of aspects 1-7, wherein the particulate polytetrafluoroethylene additive has an average particle size less than 30 μm.

Aspect 9: The polymer composition of any one of aspects 1-8, wherein the particulate polytetrafluoroethylene additive has an average particle size less than 10 μm.

Aspect 10: The polymer composition of any one of aspects 1-9, wherein the reinforcement filler is present in an amount of from about 10% by weight to about 30% by weight of the polymer composition.

Aspect 11: The polymer composition of any one of aspects 1-10, wherein the reinforcement filler comprises a carbon fiber, carbon black, glass fiber, aramid fiber, or any combination thereof.

Aspect 12: The polymer composition of any one of aspects 1-11, wherein the polymer composition exhibits a wear factor of less than 300 as determined according to ASTM D3702-78.

Aspect 13: The composition of any one of aspects 1-12, wherein the polymer composition exhibits a wear factor of less than 150 as determined according to ASTM D3702-78.

Aspect 14: The polymer composition of any one of aspects 1-13, wherein the polymer composition exhibits liquid particle count (LPC) of less than $1\times10^5$.

Aspect 15: The polymer composition of any one of aspects 1-14, wherein the polymer composition exhibits a liquid particle count (LPC) of less than $6\times10^4$.

Aspect 16: The polymer composition of any one of aspects 1-15, wherein the polymer composition exhibits a liquid particle count (LPC) of less than $3\times10^4$.

Aspect 17: The polymer composition of any one of aspects 1-16, wherein the polymer composition exhibits a liquid particle count (LPC) of less than $1\times10^4$.

Aspect 18: The polymer composition of any one of aspects 1-16, wherein the polymer composition exhibits a liquid particle count (LPC) of less than $5\times10^3$.

Aspect 19: A molded article formed from the composition of any of the preceding claims.

Aspect 20: The molded article of aspect 19, wherein the molded article is a component part for an electronic device.

Aspect 21: The molded article of aspect 20, wherein the electronic device is a hard disk drive.

Aspect 22: The molded article of aspect 20, wherein the article is a latch, ramp, or bracket.

Aspect 23: A method of a polymer composition comprising:
a) combining:
i) from about 55% by weight to about 95% by weight of a thermoplastic polymer matrix; and
ii) from about 5% by weight to about 20% by weight of a particulate polytetrafluoroethylene additive dispersed with the thermopplastic polymer matrix, wherein the particulate polytetrafluoroethyle additive has an average particle size less than 40 μm, and wherein at least 90 weight % of the particulate polytetrafluoroethylene additive particles are smaller than 60 μm; and iii) from greater than 0 weight % to about 40 weight % of a reinforcement filler dispersed within the thermoplastic polymer matrix.

Aspect 24: The method of aspect 23, further step a) further comprises an extrusion blending.

Aspect 25: The method of any one of aspects 23-24, further comprising step b) of forming a molded part from the formed polymer composition.

Aspect 26: The method of any one of aspects 23-25, wherein the thermoplastic polymer matrix comprises at least one polymer selected from a group consisting of a PC, a PC copolymer, a PA, a PEI, a PBT, and a PET.

Aspect 27: The method of any one of aspects 23-26, wherein the thermoplastic polymer matrix comprises a PC.

Aspect 28: The method of any one of aspects 23-27, wherein the thermoplastic polymer matrix comprises a bisphenol A PC polymer.

Aspect 29: The method of any one of aspects 23-28, wherein the thermoplastic polymer matrix comprises a polyester PC.

Aspect 30: The method of any one of aspects 23-29, wherein the thermoplastic polymer matrix is present in an amount of from about 60 weight percent to about 80 weight percent relative to the total weight of the polymer composition.

Aspect 31: The method of any one of aspects 23-30, wherein the particulate polytetrafluoroethylene additive has an average particle size less than 40 μm.

Aspect 32: The method of any one of aspects 23-31, wherein the particulate polytetrafluoroethylene additive has an average particle size less than 30 μm.

Aspect 33: The method of any one of aspects 23-32, wherein the particulate polytetrafluoroethylene additive has an average particle size less than 10 μm.

Aspect 34: The method of any one of aspects 23-33, wherein the reinforcement filler is present in an amount of from about 10% by weight to about 30% by weight of the polymer composition.

Aspect 35: The method of any one of aspects 23-34, wherein the reinforcement filler comprises s carbon fiber, carbon black, glass fiber, aramid fiber, or a combination thereof.

Aspect 36: The method of any one of aspects 23-35, wherein the polymer composition exhibits a wear factor of less than 300 as determined by a test according to ASTM D3702-78.

Aspect 37: The method of any one of aspects 23-36, wherein the polymer composition exhibits a wear factor of less than 150 as determined by a test according to ASTM D3702-78.

Aspect 38: The method of any one of aspects 23-37, wherein the polymer composition exhibits a liquid particle counts (LPC) of less than $1 \times 10^5$.

Aspect 39: The method of any one of aspects 23-38, wherein the polymer composition exhibits a liquid particle counts (LPC) of less than $6 \times 10^5$.

Aspect 40: The method of any one of aspects 23-39, wherein the polymer composition exhibits a liquid particle counts (LPC) of less than $3 \times 10^5$.

Aspect 41: The method of any one of aspects 23-40, wherein the polymer composition exhibits a liquid particle counts (LPC) of less than $1 \times 10^4$.

Aspect 42: The method of any one of aspects 23-41, wherein the polymer composition exhibits a liquid particle counts (LPC) of less than $5 \times 10^3$.

Aspect 43: The method of any one of aspects 25-42, wherein the molded article is a component part for an electronic device.

Aspect 44: The method of aspect 43, wherein the electronic device is a hard disk drive.

Aspect 45: method of aspect 43, wherein the article is a latch, ramp, or bracket.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in degrees Celsius (° C.) or is at ambient temperature, and pressure is at or near atmospheric.

General Materials and Methods

For the non-limiting Examples described herein, molded articles were prepared for analysis from raw materials described in Table 1, using representative compounding and molding profiles described in Tables 2 and 3 below. All samples were prepared by a melt extrusion using a 37 mm Toshiba SE Twin Screw Extruder with co-rotating twin screw (37 mm) with a barrel size of 1500 mm, and a screw speed kept at about 300-400 rpm with the torque value maintained at about 70% and operated under standard processing conditions well known to one skilled in the art. The reinforcement filler such as a glass fiber, carbon fiber or a conductive carbon black, was fed into the extruder in a downstream zone 7 (Table 2). All other components were pre-blended and fed into the extruder from a main throat at an upper stream.

The preblenidng, extrusion, molding, handling an sampling procedures strictly followed the CCS SOP, a controlled compounding process of generating materials at strict process setting requirements to meet special ionic and outgassing specifications set by the semiconductor industry.

TABLE 1

| Item | Description | Supplier | Material Function |
|---|---|---|---|
| C914089 | Sebacic acid/BPA copolymer; commercially available as Lexan HFD Resin | SABIC Innovative Plastics ("SABIC I.P.") | HFD PC (resin matrix) |
| C914090 | Sebacic acid/BPA/PCP polyestercarbonate copolymer; commercially available as Lexan HFD Resin | SABIC I.P. | HFD PC (resin matrix) |

TABLE 1-continued

| Item | Description | Supplier | Material Function |
|---|---|---|---|
| F538 | Pentaerythritol tetrastearate; commercially available from Faci as PETS G. [CAS: 115-83-3] | Faci Asia Pacific PTE LTD | Mold release agent |
| F544702 | Chopped carbon fiber with about 6 mm length and commercially available as Tenax-A HT C483 6 mm [CAS: 7440-44-0] | Toho Tenax Co., LTD | Carbon fiber (filler) |
| F6860 | Polytetrafluoroethylene (PTFE) micronised powder; commercially available from Solvay as Polymist F5-AEX [CAS: 9002-84-0] | Solvay Specialty Polymers | PTFE (filler) |
| D575295 | Polytetrafluoroethylene (PTFE) micronised powder; commercially available from Shamrock as Fluoro T 801; [CAS: 9002-84-0] | Shamrock Technologies, Inc.; Newark, NJ | PTFE (filler) |
| D576095 | Polytetrafluoroethylene (PTFE) micronised powder; commercially available from Shamrock as Fluoro T 807; [CAS: 9002-84-0] | Shamrock Technologies, Inc.; Newark, NJ | PTFE (filler) |
| D576093 | Polytetrafluoroethylene (PTFE) micronised powder; commercially available from Shamrock as Fluoro T 815; [CAS: 9002-84-0] | Shamrock Technologies, Inc.; Newark, NJ | PTFE (filler) |

TABLE 2

| Parameters | Units | Settings |
|---|---|---|
| Compounder Type | NONE | Toshiba TEM-37BS |
| Barrel Size | mm | 1500 |
| Die | mm | 4 |
| Zone 1 Temperature | ° C. | 50 |
| Zone 2 Temperature | ° C. | 100 |
| Zone 3 Temperature | ° C. | 200 |
| Zone 4 Temperature | ° C. | 250 |
| Zone 5 Temperature | ° C. | 250-270 |
| Zone 6 Temperature | ° C. | 250-270 |
| Zone 7 Temperature | ° C. | 250-270 |
| Zone 8 Temperature | ° C. | 250-270 |
| Zone 9 Temperature | ° C. | 250-270 |
| Zone 10 Temperature | ° C. | 250-270 |
| Zone 11 Temperature | ° C. | 250-270 |
| Die Temperature | ° C. | 255-275 |
| Screw Speed | rpm | 300-400 |
| Throughput | kg/hr | 30-50 |
| Vacuum | MPa | −0.08 |
| Side Feeder Speed | rpm | 300 |
| Side Feeder 1 | None | Barrel 7 |

TABLE 3

| Parameters | Units | Settings |
|---|---|---|
| Cnd: Pre-drying time | Hour | 4-6 |
| Cnd: Pre-drying temp | ° C. | 90-110 |
| Hopper Temp | ° C. | 50 |
| Zone 1 Temp | ° C. | 260-280 |
| Zone 2 Temp | ° C. | 280-320 |
| Zone 3 Temp | ° C. | 280-320 |
| Nozzle Temp | ° C. | 280-320 |
| Mold Temp | ° C. | 90-120 |
| Screw speed | rpm | 100 |
| Back Pressure | kgf/cm$^2$ | 30-80 |
| Cooling time | s | 20 |
| Molding Machine | NONE | FANUC |
| Shot Volume | mm | 84 |
| Injection speed | mm/s | 60 |
| Holding pressure | kgf/cm$^2$ | 800 |
| Max. Injection pressure | kgf/cm$^2$ | 1000 |

The notched Izod impact ("NII") test was carried out on 63.5 mm×12.7 mm×3.18 mm mm molded samples (bars) according to ISO 180 at 23° C. Test samples were conditioned in ASTM standard conditions of 23° C. and 55% relative humidity for 48 hours and then were evaluated. NII was determined using a Ceast Impact Tester.

Flexural properties (modulus and strength) were measured using 3.2 mm bars in accordance with ISO 178. Flexural strength (in units of MPa) and flexural modulus (in units of MPa) are reported at yield.

Melt volume-flow rate ("MFR") was determined according to standard ASTM D 1238 under the following test conditions: 300° C./2.16 kg load/360 sec dwell time. Data below are provided for MFR in cm$^3$/10 min.

Tensile properties (modulus, strength, and strength at yield) were measured on 3.2 mm bars in accordance with ISO 527. Tensile strength (for either at break or at yield, in units of MPa), tensile modulus (in units of MPa), and tensile elongation (%) are reported at break.

Particulate contamination was characterized by liquid particle counts (LPC). Small LPC values are desirable for semiconductor industry applications. LPC test was performed on molded articles. First, the articles were prewashed in deionized (DI) water with ultrasonic excitation at 40 KHz frequency for 3 min; and then the prewashed articles were subjected to an ultrasonic excitation at 68 KHz frequency in fresh DI water for 2 min. The particles extracted into water with the particles size from about 0.3 to about 2.0 micron were counted.

Lubricating performance or wear resistance was characterized by measuring a wear (K) factor. The wear (K) factor was measured using a Thrust Washer Wear Test. This test is analogous to the ASTM D3702-78 wear test. In a Thrust Washer Wear Test, the plastic material is injection molded into washer disc shaped specimens with a raised wear surface. The wear area (A) was calculated by equation (1):

$$A = \left\{ B \left[ \left(\frac{O.D.}{2}\right)5 - \left(\frac{I.D.}{2}\right)5 \right] \right\} in^2 \qquad \text{Eq. 1}$$

Wherein O.D. (the other diameter of the wear washer)=1.125 in., I.D. (the inner diameter of the wear washer)=0.904 in.

The specimens were conditioned according to ASTM WI-0618 standard. The standard test was conducted by rotating a plastic thrust washer at a speed of 50 ft/min and under a pressure of 40 psi against a stationary steel wear ring counterface. The multiplication of the applied pressure (psi) and speed (fpm) is known as the test pressure-velocity (PV) value and is defined by equation 2:

$$PV = (pressure)(velocity) \quad \text{Eq. 2.}$$

The PV value for the following example was PV=(40 psi) (50 ft/min)=2000PV. The test was conducted by operating the thrust washer test specimen under 2000PV for approximately 72 hours at a temperature of T=23±2° C. and a relative humidity of 50±5%. At the end of 72 hour exposure, the specimen was removed and weight loss was measured. The wear (K) factor was calculated accordingly to equation 3:

$$\text{Wear}(K)\text{ Factor} = \left[\frac{(6.1 \cdot 10^{-5}) \cdot (\text{weight loss})}{(PV) \cdot (\text{density}) \cdot (\text{time})}\right] \quad \text{Eq. 3}$$

The static and dynamic coefficients of friction were measured and calculated by equation 4:

$$\text{Coefficent of Friction} = \frac{(10.5) \cdot (\text{force})}{(\text{area}) \cdot (\text{pressure})} \quad \text{Eq. 4}$$

Wear Resistant Compositions with Low Particulate Contamination and a Low Wear Factor For the non-limiting Examples described herein below, sample compositions were prepared from the components and formulations described in Table 5 below. The performance of the compositions having various amounts and particle size of PTFE as a lubricant component was measured and discussed herein and in Table 7. The composites described herein were prepared accordingly to the compounding and molding profiles described above. The formulation compositions (labeled as "Example 1," "Example 2," and the like) are further described herein and in Table 5.

Six compositions were prepared each containing same amount of a thermoplastic polymer matrix comprising a blend of Sebacic Acid/BPA copolymer and Sebacic acid/BPA/PCP polyestercarbonate. PTFE with a particle size of 50-60 μm was added in various amounts to Examples 1 and 4. PTFE with a particle size of 30 μm was added in various amounts to Examples 2 and 5. PTFE with a particle size of 5 μm was added in various amounts to Examples 3 and 6. Carbon fiber was added in an amount to bring the total amount of carbon fiber and PTFE to 25 wt. %. All other components were kept at the same amount in all samples and are described in Table 5. Particle size properties for the various PTFE fillers used herein are are described in Table 6.

It was observed that when PTFE with a particle size of 50-60 μm was used as a lubricant, the wear (K) factor was lower at higher concentrations of PTFE, however, it also resulted in a higher particulate contamination (Examples 1 and 4). Decrease in a particle size resulted in the improved wear (K) factor and a lower particulate contamination (Examples 2 and 5), wherein the lowest wear (K) factor and the lowest particulate contamination was observed for PTFE additives with a particle size of 5 μm (Examples 3 and 6). It was also observed that addition of PTFE as a lubricant agent did not affect significantly tensile, flexural and impact strength properties of the polymer composition.

TABLE 5*

| Material Description | Material Detail | EX. 1 | EX. 2 | EX. 3 | EX. 4 | EX. 5 | EX. 6 |
| --- | --- | --- | --- | --- | --- | --- | --- |
| C914089 copolymer | HFD PC, Low Mw. | 55.8 | 55.8 | 55.8 | 55.8 | 55.8 | 55.8 |
| C914090 copolymer | HFD PC, High Mw. | 18.7 | 18.7 | 18.7 | 18.7 | 18.7 | 18.7 |
| Shamrock Fluor T-801 | PTFE-1 (50-60 μm) | 15 | | | 10 | | |
| Shamrock Fluor T-807 | PTFE-2 (30 μm) | | 15 | | | 10 | |
| Shamrock Fluor T-815 | PTFE-2 (5 μm) | | | 15 | | | 10 |
| Tenax-A HT C483 6 mm | Chopped carbon fiber | 10 | 10 | 10 | 15 | 15 | 15 |
| F538 (PETS) | Mold Release Agent | 0.5 | 0.5 | 0.5 | 0.5 | 0.5 | 0.5 |
| Pigment Carbon Black, Med. Color Powder | Black Colorant | 0.2 | 0.2 | 0.2 | 0.2 | 0.2 | 0.2 |
| Formulation Total | | 100.2 | 100.2 | 100.2 | 100.2 | 100.2 | 100.2 |

*Amounts provided in terms of percent of total composition (by weight).

TABLE 6

| Parameter | SHAMROCK T801 | SHAMROCK T815 | SHAMROCK T807 |
| --- | --- | --- | --- |
| Particle size 10% | 25.6 | 4.6 | 7.8 |
| Particle size 50% | 52.3 | 6.9 | 14 |
| Particle size 90% | 92.2 | 11.3 | 22.8 |
| Mean | 56.8 | 8.3 | 15.2 |
| Std. dev. | 28 | 6.9 | 8.6 |
| Particle size 95% | 100 | 10 | 30 |
| Particle size mean value | 35 | 30 | 10 |

TABLE 7

| Typical Property | Test Method | EX. 1 | EX. 2 | EX. 3 | EX. 4 | EX. 5 | EX. 6 |
| --- | --- | --- | --- | --- | --- | --- | --- |
| Liquid Particle Counting-1st extraction | | 56430 | 21985 | 14242 | 36176 | 22189 | 9685 |
| Wear (K) Factor | | 103 | 112 | 108 | 128 | 114 | 93 |
| Total Hydrocarbon, ppb | | 3.49 | 3.61 | 4.58 | 4.74 | 4.19 | 4.95 |
| Outgassing, ppm | | 0.072 | 0.100 | 0.069 | 0.087 | 0.075 | 0.064 |

TABLE 7-continued

| Typical Property | Test Method | EX. 1 | EX. 2 | EX. 3 | EX. 4 | EX. 5 | EX. 6 |
|---|---|---|---|---|---|---|---|
| Density, g/cm$^3$ | ISO 1183 | 1.33 | 1.32 | 1.32 | 1.3 | 1.31 | 1.31 |
| Tensile Modulus (MPa) | ISO 527 | 8126 | 8181 | 8102 | 10780 | 10954 | 10829 |
| Tensile Strength (MPa) | ISO 527 | 107.4 | 109 | 108.2 | 129.4 | 131.5 | 130.7 |
| Notched Izod Impact Strength (KJ/m$^2$) | ISO 180 | 10.66 | 10.66 | 11.02 | 10.53 | 11.38 | 11.3 |
| Flexural Modulus (MPa) | ISO 178 | 7320 | 7489 | 7337 | 9985 | 9827 | 10074 |
| Flexural Strength (MPa) | ISO 178 | 173 | 174 | 175 | 204 | 205 | 208 |
| MFR (g/10 min) | ASTM1238 | 24 | 24.5 | 24.3 | 24.2 | 23.7 | 25.1 |

It will be apparent to those skilled in the art that various modifications and variations can be made in the present disclosure without departing from the scope or spirit of the disclosure. Other aspects of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A polymer composition comprising:
   a) from about 55 weight % to about 95 weight % of a thermoplastic polymer matrix;
   b) from about 5 weight % to about 20 weight % of a particulate polytetrafluoroethylene additive dispersed within the thermoplastic polymer matrix, wherein the particulate polytetrafluoroethylene additive has an average particle size less than about 40 μm, and wherein at least 90 weight % of the particulate polytetrafluoroethylene additive particles are smaller than about 60 μm; and
   c) from greater than 0 weight % to about 40 weight % of a reinforcement filler dispersed within the thermoplastic polymer matrix; and
   wherein the polymer composition exhibits a wear factor of less than about 300 as determined according to ATM D3702-78.

2. The polymer composition of claim 1, wherein the thermoplastic polymer matrix comprises at least one polymer selected from the group consisting of a polycarbonate, a polycarbonate copolymer, a polyamide, a polyetherimide, a polybutylene terephthalate, and a polyethylene terephthalate.

3. The polymer composition of claim 1, wherein the thermoplastic polymer matrix comprises a polycarbonate.

4. The polymer composition of claim 1, wherein the thermoplastic polymer matrix comprises a bisphenol A polycarbonate polymer.

5. The polymer composition of claim 1, wherein the thermoplastic polymer matrix comprises a polyester polycarbonate copolymer.

6. The polymer composition of claim 1, wherein the thermoplastic polymer matrix is present in an amount of from about 60 weight % to about 80 weight % relative to the total weight of the polymer composition.

7. The polymer composition of claim 1, wherein the particulate polytetrafluoroethylene additive has an average particle size less than about 30 μm.

8. The polymer composition of claim 1, wherein the reinforcement filler is present in an amount of from about 10 weight % to about 30 weight % of the polymer composition.

9. The polymer composition of claim 1, wherein the reinforcement filler comprises a carbon fiber, carbon black, glass fiber, aramid fiber, or any combination thereof.

10. The polymer composition of claim 1, wherein the polymer composition exhibits a liquid particle count of less than $1 \times 10^5$.

11. A molded article formed from the composition of claim 1.

12. The molded article of claim 11, wherein the molded article is a component part for an electronic device.

13. A method of making a polymer composition comprising combining:
   a) from about 55 weight % to about 95 weight % of a thermoplastic polymer matrix;
   b) from about 5 weight % to about 20 weight % of a particulate polytetrafluoroethylene additive dispersed with the thermoplastic polymer matrix, wherein the particulate polytetrafluoroethylene additive has an average particle size less than about 40 μm, and wherein at least 90 weight % of the particulate polytetrafluoroethylene additive particles are smaller than about 60 μm; and
   c) from greater than 0 weight % to about 40 weight % of a reinforcement filler dispersed within the thermoplastic polymer matrix.

14. The method of claim 13, wherein the thermoplastic polymer matrix comprises at least one polymer selected from a group consisting of a polycarbonate, a polycarbonate copolymer, a polyamide, a polyetherimide, a polybutylene terephthalate, and a polyethylene terephthalate.

15. The method of any of claim 13, wherein the thermoplastic polymer matrix comprises a polycarbonate.

16. The method of any of claim 13, wherein the thermoplastic polymer matrix comprises a bisphenol A polycarbonate polymer.

17. The method of claim 13, wherein the thermoplastic polymer matrix comprises a polyester polycarbonate.

18. The method of claim 13, wherein the thermoplastic polymer matrix is present in an amount of from about 60 weight % to about 80 weight % relative to the total weight of the polymer composition.

19. The method of claim 13, wherein the particulate polytetrafluoroethylene additive has an average particle size less than about 40 μm.

20. The method of claim 13, wherein the reinforcement filler is present in an amount of from about 10 weight % to about 30 weight % of the polymer composition.

21. The method of claim 13, wherein the reinforcement filler comprises carbon fiber, carbon black, glass fiber, aramid fiber, or a combination thereof.

22. The method of claim 13, wherein the polymer composition exhibits a wear factor of less than about 300 as determined by a test according to ASTM D3702-78.

23. The method of claim 13, wherein the polymer composition exhibits a liquid particle counts of less than $1\times10^5$.

24. The method of claim 13, further comprising forming the polymer composition into a molded article.

25. The method of claim 24, wherein the molded article is a component part for an electronic device.

* * * * *